(12) United States Patent
Ulman et al.

(10) Patent No.: US 6,367,418 B1
(45) Date of Patent: Apr. 9, 2002

(54) FEEDER MONITOR AND FEEDER MONITORING NETWORK

(75) Inventors: Edward A. Ulman, New Brunswick, NJ (US); Barrie Hopewell, Higganum, CT (US); Nathan B. Price, New Haven, CT (US); Frederick E. Jackson, Wethersfield, CT (US); Daniel E. Shapiro, Branford, CT (US)

(73) Assignee: Research Diets, Inc., New Brunswick, NJ (US)

( * ) Notice: Subject to any disclaimer, the term of this patent is extended or adjusted under 35 U.S.C. 154(b) by 0 days.

(21) Appl. No.: 09/810,588

(22) Filed: Mar. 16, 2001

Related U.S. Application Data

(62) Division of application No. 09/302,068, filed on Apr. 29, 1999, now Pat. No. 6,234,111.

(51) Int. Cl.⁷ ............................ A01K 39/00; A01K 5/00
(52) U.S. Cl. ....................................... 119/54; 119/57.92
(58) Field of Search ........................... 119/53, 53.5, 54, 119/57.1, 51.02, 57.92

(56) References Cited

U.S. PATENT DOCUMENTS

| | | | |
|---|---|---|---|
| 1,595,758 A | 8/1926 | Collins | 119/54 |
| 3,114,435 A | 12/1963 | King et al. | |
| 3,334,614 A | 8/1967 | Glass et al. | |
| 3,763,826 A | 10/1973 | Portelli | 119/52 R |
| 3,782,334 A | 1/1974 | Leon et al. | 119/54 |
| 3,884,189 A | 5/1975 | Ruth | 119/51.13 |
| 3,919,977 A | 11/1975 | Clark | |
| 3,929,277 A | 12/1975 | Byrne et al. | 119/51 |
| 3,965,868 A | 6/1976 | Hunziker, Jr. | 119/52 |
| 3,974,798 A | 8/1976 | Meetze, Jr. | |
| 4,020,794 A | 5/1977 | Nethery | 119/58 |
| 4,049,950 A | 9/1977 | Byrne et al. | 235/61.6 |
| 4,303,039 A | 12/1981 | Thibault | 119/52 |

(List continued on next page.)

FOREIGN PATENT DOCUMENTS

GB 2 251 778 A 7/1992

Primary Examiner—Peter M. Poon
Assistant Examiner—Elizabeth Shaw
(74) Attorney, Agent, or Firm—Duane Morris LLP; Steven E. Koffs

(57) ABSTRACT

An animal feeder has a hopper for storing pieces of food. The bottom of the hopper has an opening accessible by an animal. The opening is smaller than a piece of food, but large enough for the animal to gnaw the food through the opening. The hopper has a surface adjacent the opening, to receive fallen gnawed food and hold the fallen gnawed food in a position accessible by the animal for eating. The hopper engages a mounting bracket. The bracket is directly attachable to the animal's cage. The bracket has a lip which partially covers the receiving surface of the hopper to physically limit the animal from leaning on the hopper and to prevent the hopper from tipping back so far that it falls off the conical mount. A conical bottom surface is attached to the hopper. The conical bottom surface seats on a conical mount. The conical mount transmits a downward force from the conical bottom surface to a sensor, but does not transmit an upward force or moment to the sensor. The average weight of the hopper and the variance or standard deviation of the sensor output signal are calculated by an embedded processor, based on the output of the sensor. The beginning and end of a feeding are determined based on the standard deviation. The amount of the food consumed by the animal during the feeding is calculated. Each feeder has a respective gate. The animal can access food when the gate is open, but not when the gate is closed. A plurality of actuators automatically open and close each gate in response to control signals. A plurality of animals, each in an individual cage with a separate hopper, are simultaneously monitored and data are periodically accessed by a host computer.

16 Claims, 15 Drawing Sheets

U.S. PATENT DOCUMENTS

| | | |
|---|---|---|
| 4,373,471 A | 2/1983 | Coulbourn .................... 119/72 |
| 4,401,056 A | 8/1983 | Cody et al. .................... 119/54 |
| 4,432,304 A | 2/1984 | Johnsson ................... 119/52.1 |
| 4,448,150 A | 5/1984 | Catsimpoolas |
| 4,485,764 A | 12/1984 | Kieper |
| 4,665,863 A | 5/1987 | Toledo ................... 119/51.13 |
| 4,672,917 A | 6/1987 | Fox .............................. 119/52 |
| 4,784,084 A | 11/1988 | Kohguchi et al. |
| 4,800,844 A | 1/1989 | Van Gilst ................. 119/51.5 |
| 4,825,811 A | 5/1989 | O'Kelley ................... 119/51.5 |
| 4,834,801 A | 5/1989 | Kalla et al. |
| 4,902,890 A | 2/1990 | Biehle ..................... 250/222.1 |
| 5,010,846 A | 4/1991 | Nass |
| 5,046,455 A | 9/1991 | Christiansen et al. ...... 119/56.1 |
| 5,105,767 A * | 4/1992 | Gordon et al. ........... 119/57.92 |
| 5,163,380 A * | 11/1992 | Duffy et al. .................. 119/54 |
| 5,351,645 A | 10/1994 | Brennon |
| 5,355,833 A * | 10/1994 | Legrain .................... 119/57.92 |
| 5,499,609 A | 3/1996 | Evans et al. .................. 119/61 |
| 5,509,376 A | 4/1996 | Tsengas ..................... 119/51.5 |
| 5,559,716 A | 9/1996 | Gaalswyk ................ 119/51.02 |
| 5,577,464 A | 11/1996 | Wellington et al. ......... 119/475 |
| 5,636,470 A | 6/1997 | Blomquist .................... 43/131 |
| 5,694,885 A | 12/1997 | Dietrich et al. ............. 119/477 |
| 5,730,081 A | 3/1998 | Tsengas ................... 119/51.5 |
| 5,816,191 A | 10/1998 | Beaudoin et al. ........ 119/51.02 |
| 5,819,686 A | 10/1998 | Credeur ..................... 119/51.5 |
| 5,826,545 A | 10/1998 | Steffes et al. ............... 119/473 |
| 5,992,349 A | 11/1999 | Sachs ....................... 119/52.1 |
| 6,044,795 A * | 4/2000 | Matsuura et al. ............. 119/53 |
| 6,076,043 A * | 6/2000 | Liu .............................. 119/53 |

\* cited by examiner

FEEDER MONITOR AND FEEDER MONITORING NETWORK

This application is a divisional of Ser. No. 09/302,068, filed Apr. 29, 1999, now U.S. Pat. No. 6,234,111.

FIELD OF THE INVENTION

The present invention is related to the field of systems for feeding and monitoring laboratory animals.

DESCRIPTION OF THE RELATED ART

Most biological values measured in laboratory animals respond to qualitative and quantitative variations in food intake. Therefore, methods to assess and vary food quality and quantity are important to all biological researchers, especially to nutrition biologists.

Techniques to assay and change the nutrient quality of lab animal feeds are well established and practiced; however, current methods to measure food intake and feed restrict lab animals are limited and crude.

The common method for measuring food intake of laboratory animals is manual. By this method, a technician loads food into a hopper and weighs the food and hopper at a beginning time. At the end of an interval, the technician again weighs the food and hopper. Food removed over this period is calculated by the difference in weight. Because existing food hoppers are not spill proof, food removed does not necessarily equal food consumed, and correction must be made for food removed but not eaten. Often, removed food falls to the tray where feces and urine collect. To determine how much food was spilled, the technician must meticulously separate the food from solid waste, weigh the spilled food and estimate a correction factor to compensate for the amount of urine that has been absorbed by the dry food.

Thus, this manual method is limited by how often the technician can perform these activities. Also, because these activities require handling of food and (usually) the animal, they are likely to disturb the animal's feeding behavior, often starting meals of resting animals, or stopping meals of feeding animals. Because of these factors, food intake measurements are usually performed only once or twice weekly, or at most, once or twice daily. Thus, not only are food intake data inaccurate, they also do not allow resolution of 24 hour, diurnal, patterns of food intake.

Two types of partly automated food intake monitoring systems exist. Both require moving animals to specialty housing. In the first, food cups are placed on standard electronic balances, and animals eat from these cups through holes in the bottom of their cage. The gross weight of the food cup is recorded at specified intervals. These weighings can be made often and without disturbing the animals. However, like the manual method, this method does not prevent spillage of food, or fouling of food with urine and feces, thus measuring false increases and decreases in food intake. In addition separating food intake data from the recorded weighings is complicated by the possibility that weighings are changed by the animal touching the food cup at the moment of recording.

In the second method, food is provided as tablets of known weight. Tablets are dispensed when an animal "requests" them by learned behavior such as bar pressing, or by feedback when a tablet receptacle is determined to be empty following removal of the last tablet by the animal. Food intake is determined from the number of tablets dispensed. As previously, this method does not limit food spillage. Also, it can not differentiate between food intake and simple food hoarding. Also, the animal's diet is limited to materials that can be tableted, thus intake of high fat foods, which can not be tableted, can not be measured by this method.

The above methods determine food intake of animals presented food when unrestricted by time or amount, that is, when allowed ad libitum access to food. However, biologists often want to restrict food intake by amount or time or both. Meal feeding access is limitation of food intake by time alone. Manually, meal feeding is accomplished by simple presentation or removal of food following a schedule. Like the methods described above, meal feeding is laborious, and the presence of the technician may again introduce changes in behavior.

To restrict food by amount, technicians weigh daily amounts of food less than what the animal would consume ad libitum and offer it to the animal once a day. Animals thus restricted, usually consume the smaller amount of food quickly and then fast for the time remaining till the next feeding. This virtual meal feeding complicates the effects of food restriction This effect can be minimized by splitting the restricted amount into several feedings per day. But this introduces more technician labor and interference with animals behavior.

SUMMARY OF THE INVENTION

Our patent describes a system consisting of: (1) a spill proof food hopper, which does not limit or interfere with the natural food intake of ad libitum fed animals; (2) a hardware and software system to continuously monitor the weight of this hopper, detecting and recording the time, duration and amount of each meal; (3) a gate system to restrict food intake by time, amount, or both; and (4) a means to do this for one, tens or hundreds of animals coincidentally.

To date, no system exists to control gate opening and closing not simply by time, but by time and amount, thus allowing access to food at a prescribed time for a prescribed time period or until a prescribed amount of food is consumed.

One aspect of the present invention is an animal feeder, comprising a hopper for storing pieces of food. A bottom portion of the hopper has a first opening which is accessible by an animal. The first opening is smaller than one of the pieces of food, but large enough for the animal to gnaw the food through the first opening. The hopper has a receiving surface adjacent to the first opening. The receiving surface is positioned to receive fallen gnawed food and hold the fallen gnawed food in a position accessible by the animal for eating. The hopper is seated on a mounting bracket. The mounting bracket is directly attachable to a container in which the animal is housed.

Another aspect of the invention is a bottom mounting surface attached to the hopper. The bottom mounting surface is removably seated on a self-centering mount. The self-centering mount allows freedom of movement and freedom of rotation by the hopper within a set of predetermined limits. The bottom mounting surface returns to a centered position after a movement or rotation, by operation of gravity.

Another aspect of the invention is a self-centering mount that transmits a downward force from the hopper to a measuring device. The self-centering mount does not transmit an upward force or moment from the hopper to the measuring device.

Another aspect of the invention is a system, method and computer program for calculating an amount of food consumed by an animal. A force applied to a food hopper is measured, and an output signal representing the force is provided. An average weight of the hopper is calculated based on the output signal, and a statistical measure of the output signal other than the average weight is calculated. A beginning and an end of a feeding are identified based on the statistical measure. An amount of the food consumed by the animal during the feeding is calculated based on the average weight before the beginning of the feeding and the average weight after the end of the feeding.

Still another aspect of the invention is a system for controlling feeding of a plurality of animals, comprising a plurality of animal feeders. Each feeder has a respective gate. Each gate has an open position and a closed position, such that a respective animal can access food from a respective feeder when the gate of that feeder is open, and the respective animal cannot access food from a respective feeder when the gate of that feeder is closed. A processor having an embedded CPU determines an amount of food removed from each respective feeder by the respective animal that has access to that feeder. A plurality of actuators automatically open and close each gate in response to control signals. The processor has means for receiving a signal indicating that either a first operating mode, a second operating mode, or a third operating mode is selected. The processor generates and transmits the control signals to each of the plurality of actuators so as to provide access to each animal for a common length of time, if the first operating mode is selected. The processor generates and transmits the control signals to each of the plurality of actuators so as to provide food access to each animal until a common amount of food is removed from each feeder, if the second operating mode is selected. The processor generates and transmits the control signals to each of the plurality of actuators so as to provide food access to each animal until either a common length of time passes or a common amount of food is removed from each feeder, whichever occurs first, if the third operating mode is selected.

Another aspect of the invention is an animal monitoring system comprising a plurality of cage controllers. Each cage controller has a respective processor and a storage device coupled to the processor. Each cage controller receives and stores sensor data from a sensor that collects sensor data from a respective animal specimen. Each cage controller calculates statistics from the sensor data. Each of the plurality of cage controllers is coupled to a local host computer. The local host computer is capable of issuing commands to each of the cage controllers to control collection of the sensor data.

These and other aspects of the invention are described below with reference to the exemplary embodiments.

BRIEF DESCRIPTION OF THE DRAWINGS

FIG. 17A is a cutaway right side elevation view of the hopper with the right side wall removed. FIG. 17B is a cutaway front isometric view of hopper with the front panel removed. FIG. 17C is a front isometric view of hopper.

INTRODUCTION

FIGS. 1–6 show a feeder monitoring system 100 that can measure moment to moment feeding behavior of one, ten, or hundreds of lab animals 101 continuously and simultaneously.

Figure 6:
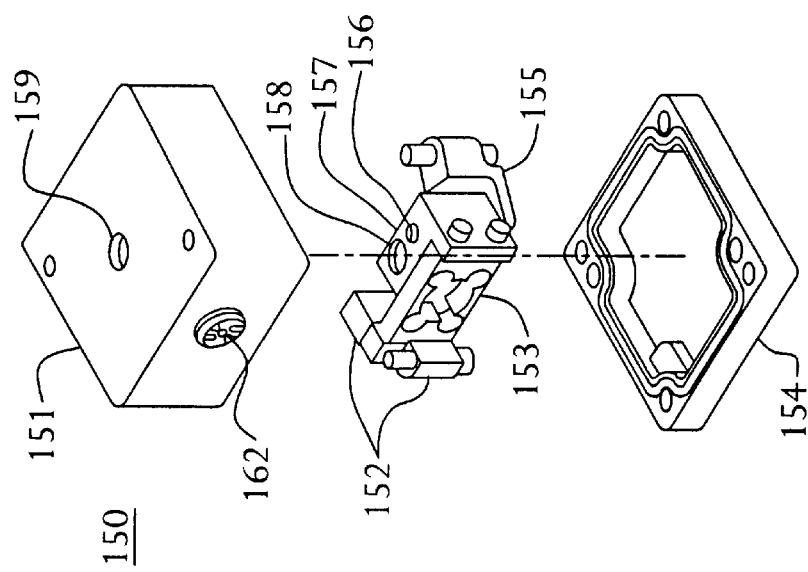
FIG. 6 is an exploded isometric view of the load cell assembly shown in FIG. 1.
Figure 11:
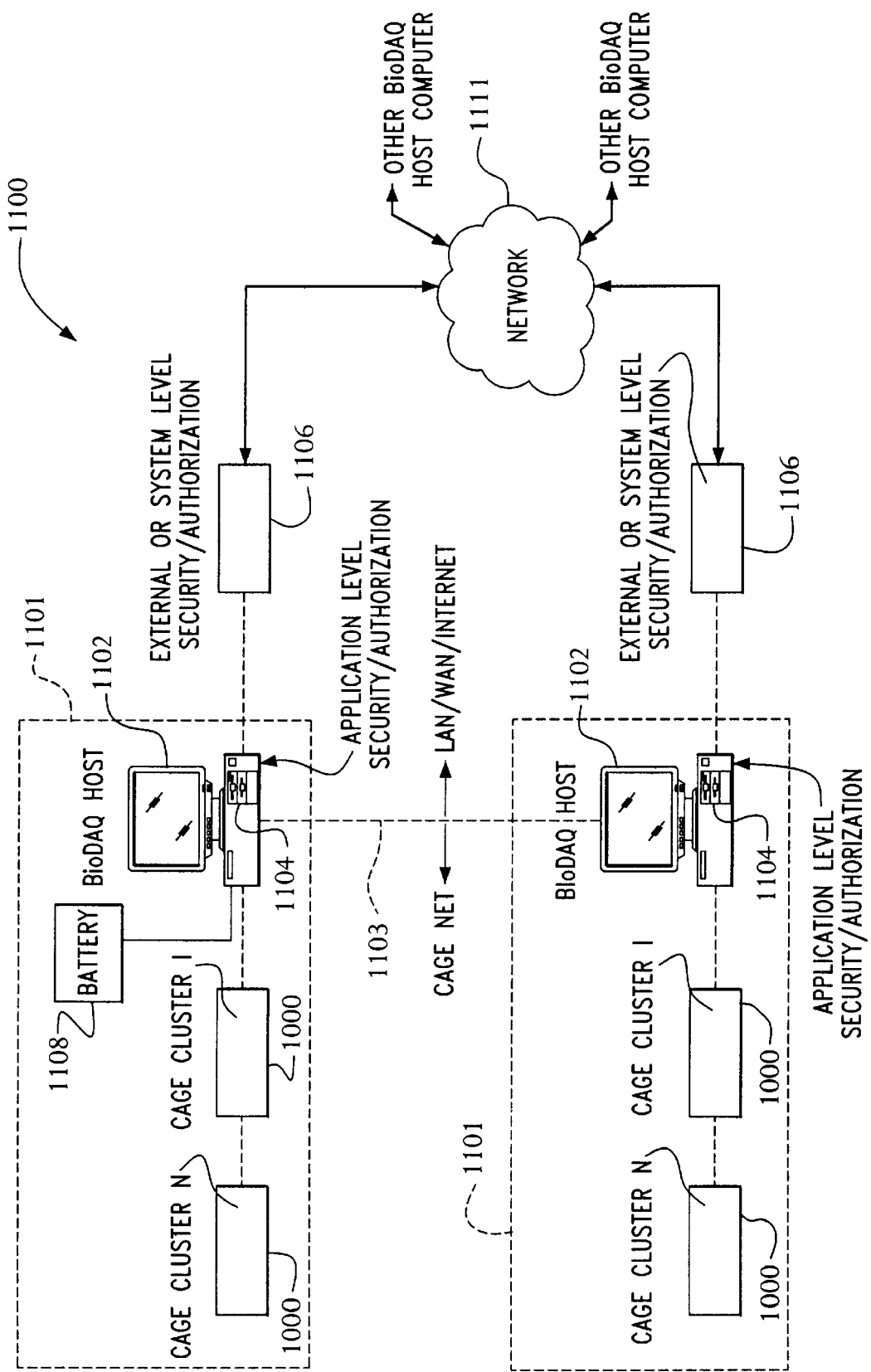
FIG. 11 shows a system for monitoring and controlling a plurality of the feeder clusters shown in FIG. 10.

The system 100 includes an intake food hopper 110 which is connected to a weight monitor or load cell 150. One or more of these units 100 is mounted to a standard laboratory animal housing system 102. The multiple units 100 are individually addressed and serially connected to each other and to a host computer 1102 (FIG. 11). A single, intuitive application on the host computer 1102 permits the user to: set up individual or group feeding protocols; automatically collect and store data in spread sheet or data base files; evaluate data using the system meal vector analysis hardware/software; and generally monitor, control and analyze the food intake sensors 153 (FIG. 6). Other sensors may also be connected to the host computer 1102 to monitor and control a variety of environmental stimuli such as relative humidity, temperature, light, noise, etc. and record their effects on animal feeding behavior. The system can automatically measure and record the animal's activity or rest behavior signature, its body weight, breathing rate, and heart rate, as well. Finally, one, ten or hundreds of host computers 1102 running the monitoring application may be networked together.

A system 100 according to the invention provides an automated, unattended, spill proof operating system for continuously monitoring and restricting food intake of laboratory animals 101.

There are many types of feeding regimens. Feeding "ad libitum" is defined as "feeding at will or as desired, without being limited by time or amount of food". Conversely, "restrictive feeding" is defined as "limiting animal feeding by time, amount of food, or both". The BioDAQ System 100 is an automatic, unattended laboratory animal food intake monitoring system that can monitor any feeding regimen, whether it be ad libitum or restricted. Also, it can automatically measure and record the animal's body weight, as well as record and control room temperature, humidity, lighting, noise and any other environmental stimulus a biologist cares to introduce.

This system can be adapted to most lab animals including rats, mice, gerbils, hamsters, guinea pigs, rabbits, ferrets, dogs, poultry, and others. It can be loaded with standard or custom feeds in different forms including powders, pellets or liquids with various proteins, fats, carbohydrates, vitamins, minerals, medications or other additives. The sturdy, autoclavable food hopper 110 (with weight sensor 150) adapts to standard lab animal cages 102, with one or more hoppers mounted to each cage. The weight sensor analog output signal is converted to a digital data stream and then statistically interpreted by the system hardware/software into meal vectors. Each meal vector consists of the time the meal begins ($T_{start}$), the duration of the meal ($T_{end}$–$T_{start}$), and the amount of food consumed (B1–M). In the exemplary embodiment, the software calculates the mean and standard deviation of the consecutive data stream and then interprets changes in these values to establish these accurate meal vectors.

Species-specific hoppers may be designed to allow 100% free access to food while eliminating food spillage, food hoarding, and preventing food contamination with urine or feces. This guarantees that all food 103 removed from the hopper 110 is eaten by the animal 101. A "species-specific" design means that the hopper design is tailored to the animal's anatomy and eating behavior. For each animal, the dimensions of the slots 102 and 103 are chosen to accommodate the size of that animal, so that food can be gnawed, but whole pellets 103 cannot be removed.

The system described herein has many possible variants and alternate configurations which can readily be constructed by one of ordinary skill in the art without any undue experimentation. The system provides a laboratory animal food intake monitoring system having at least one food hopper, which is mountable to standard laboratory animal cages. Preferably, the food hopper design is spill proof, and prevents an animal from hoarding food in its bedding. Preferably, hopper 110 further prevents food contamination by animal urine or feces. Preferably, the food hopper design does not introduce changes to "normal" animal feeding behavior compared to traditional feeders. Preferably, the system automatically monitors granular, powdered as well as pelletized food.

Preferably, the hopper assembly includes a load cell 153 that electronically monitors animal feeding activity. Preferably, the load cell mounting interface prevents transmission of torsional loads, moments and "negative direction" or tensile loads to the load cell, which minimizes "toggle" error. Preferably, the hopper 110 has a restrictive area 114 within which the animal can gnaw at the food 103 and the dynamic mounting of the hopper 110 to the load cell 153, having the added benefit of jarring the food while the animal eats, which prevents the food from damming up or getting stuck in the hopper. Sensors 153 such as force balance sensors, silicon strain gage sensors, capacitance sensors, quartz sensors, pressure sensors, pressure transducers, bonded strain gage load cells and other technology sensors may be used to measure change in weight or mass.

Preferably, the monitoring by the load cell 153 is continuous, programmable and automatic. Preferably, the food intake monitoring system continuously monitors the eating behavior of a laboratory animal. The frequency of monitoring may be programmable by a user defined input value. Preferably, the system allows automatic, unattended monitoring of eating behavior of animal. Standard deviation, variance, first or second derivative, or other statistical parameters may be used to establish a change in behavior of an animal such as the beginning or end of a meal, the end of a rest period, an animal getting up to walk, etc. Preferably, a battery operated microcontroller 701 controls data collection devices which can operate with no external power.

Optionally, a system according to the invention may have an electronically controlled access gate 170. The controls 700 for the access gate 170 may be programmed to restrict the feeding of individual animals or to restrict the feeding of one animal relative to another. The controls may automatically open or close food hopper gate 170 and restrict an animal's food intake by amount, time period of feeding or both. The system may automatically compare two animals (pair feeding) and match their food intake by amount, time or both. Distributed logic may be used to allow distributed control of access to food, water, medications, etc.(at the cage level). A computer based system may be used to control food access by time of day, meal length, meal size, cumulative food intake from some previous point in time or consumption parameters, or other user defined variables. The system may use other non-time or food defined inputs such as light, animal activity, noise, temperature, etc. to limit or control access to food. The gate may be used to prevent the animal from getting access to its food based on a signal from the system, either remotely or locally.

The system can handle monitoring of many cages 102 simultaneously. Each cage 102 may have one or more hoppers 110 mounted to it; multiple hoppers 110 in a single cage 102 can accommodate and monitor the consumption of different types and forms of food and liquid.

Individually addressable processors for each respective cage may use other techniques such as IP addresses, hardwired cages (separate wire to each cage), "smart sensors which are individually addressable" and other networkable techniques. A group of individual sensors 153 and/or animal cages with one or more sensors may be connected to a computer with a digital communications protocol such as RS232, RS485, Hartl., etc. Further, wireless communication may be used to transmit data from an individual cage (sensor 153 or group of sensors) to a central data collection point, which can be a computer 1102 or a distributed data collector, which in turn communicates with a computer: this second connection being either wired or wireless.

GLOSSARY

1. "BioDAQ Food Intake Monitoring System" refers to the entire system, software and hardware together.
2. "Intake Food Hopper" is the food-containing hopper.
3. "Mounting Bracket " is the sheet metal base which mounts on the animal container (which may be a cage) and holds the Intake Food Hopper.
4. "Load Cell Assembly" is the combination of the load cell, the load cell enclosure, and the Conical Mount upon which the food hopper sits.
5. "CageDAQ Module" is the microcontroller/Analog-to Digital Converter (ADC) box which is a "node" on the CageNet(see below). In the context of the CageNet network, it is a slave device, "speaking only when spoken to".

6. "Cage Cluster" is an aggregation of animal cages (for example, 12 cages) with 1 or more associated Intake Food Hoppers, Mounting Bracket, Load Cell assemblies and CageDAQs per cage.
7. "CageNet" is a series of Cage Clusters networked together and controlled by a "host" (see below). In the example, each Cage Cluster has its own power supply and is optically isolated from the next; thus, the number of nodes on a CageNet is limited only by the logical addressing scheme used by the CageDAQ software. It is a simple, robust, proprietary network which is separate from a facility's intranet, local area network (LAN), wide area network (WAN) or the Internet. The sharing of data and control signals between CageNets is accomplished at the user's discretion by Host Networking.
8. "Cage Cluster Interface Module" is the module associated with every Cage Cluster. It provides power for all CageDAQs in the cluster, plus an opto-isolated network interface to the previous and next Cage Cluster (or to the Host). It is not a network node itself, having no network address.
9. "BioDAQ Host Computer" is the computer that runs the "Food Intake Monitor" application and collects data from the CageDAQ nodes on the CageNet. In the context of the CageNet network, it is the master device and initiates all data transfer over the CageNet.
10. "BioDAQ Food Intake Monitor" is the name of the Labview application on the host computer.
11. "BioDAQ CageDAQ Program" is the firmware in the CageDAQ 700.
12. "Conical Mount" is a spring-loaded post that supports the food hopper. Its function is to transfer the dynamic weight of the food hopper and its contents to the load cell.
13. "BioDAQ Host Application" is the application running on the Host Computer. This includes, but is not be limited to, "BioDAQ Food Intake Monitor Program", which may run under Windows 95.
14. "Message Primitives" are the messages passed between the Host Computer and the CageDAQ 700, and are the building blocks of all CageNet communication. These primitives may also be passed from one Host Computer to another, encapsulated in network packets.
15. "Host-Level Message" is another type of message passed between BioDAQ Host Applications over the network, but it contains higher level content and does not address any CageDAQs.

DETAILED DESCRIPTION

Figure 2:
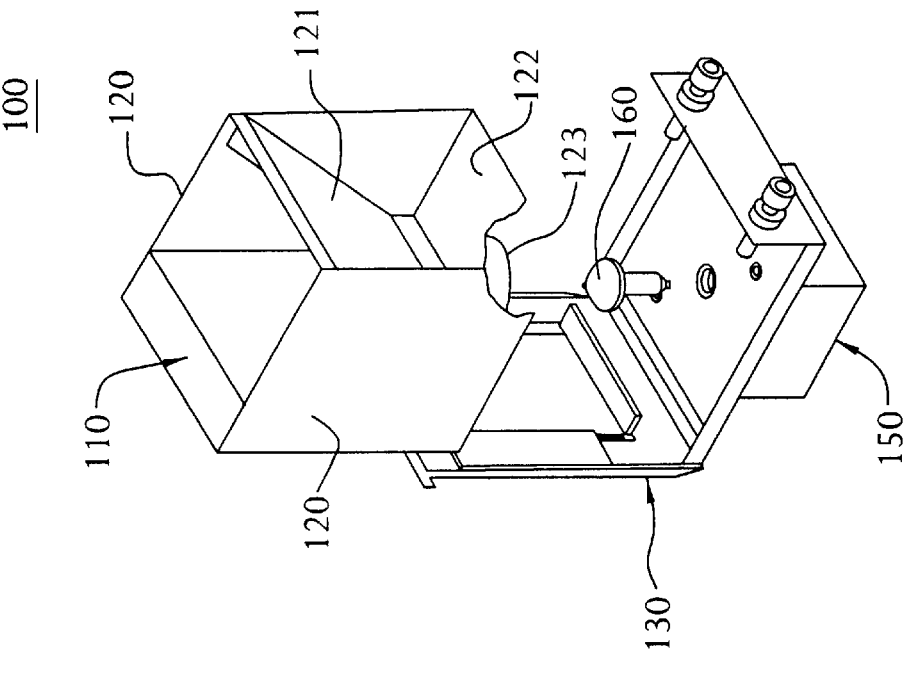
FIG. 2 is an exploded isometric view of the feeder and mounting bracket shown in FIG. 1.
Figure 1:
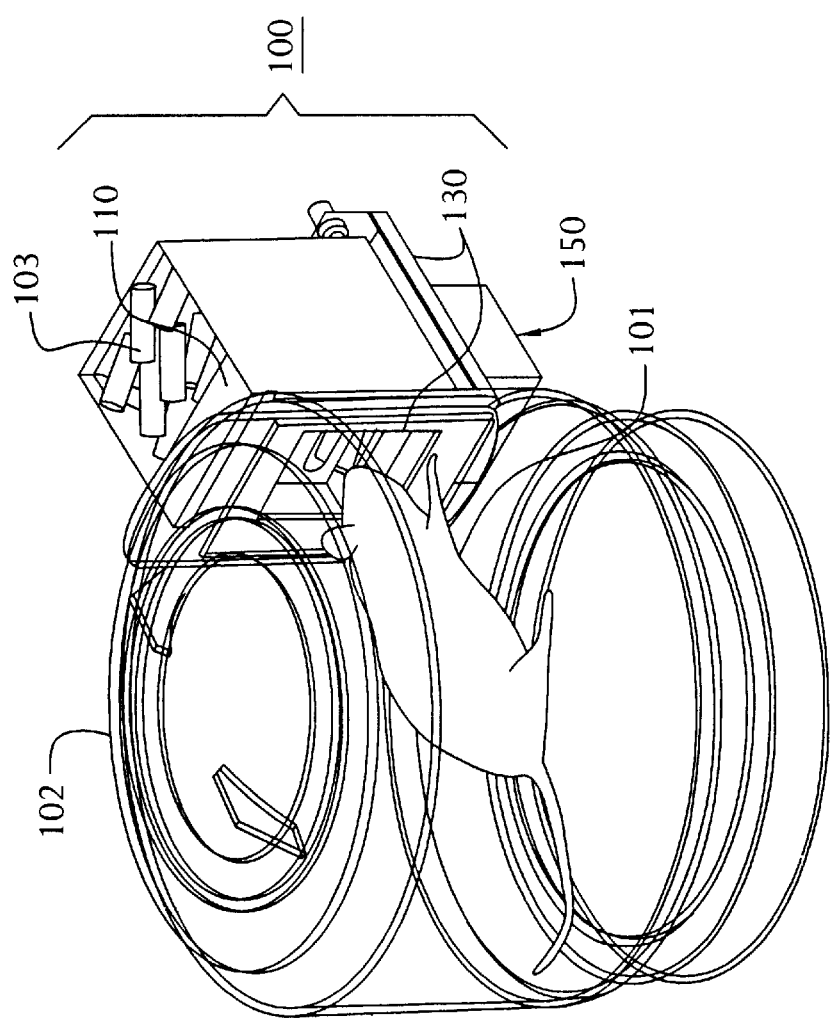
FIG. 1 is an isometric view of an animal cage with an exemplary feeder in accordance with the present invention attached thereto.

FIG. 1 shows a standard cage 102, housing animal specimen 101. Specimen 101 is presented with food 103, in food hopper 110. Hopper 110 is mounted on load cell assembly 150, and is attached to cage mount 130. FIG. 2 shows a rear exploded view of assembly 100 detached from the cage 102.

Figure 3:
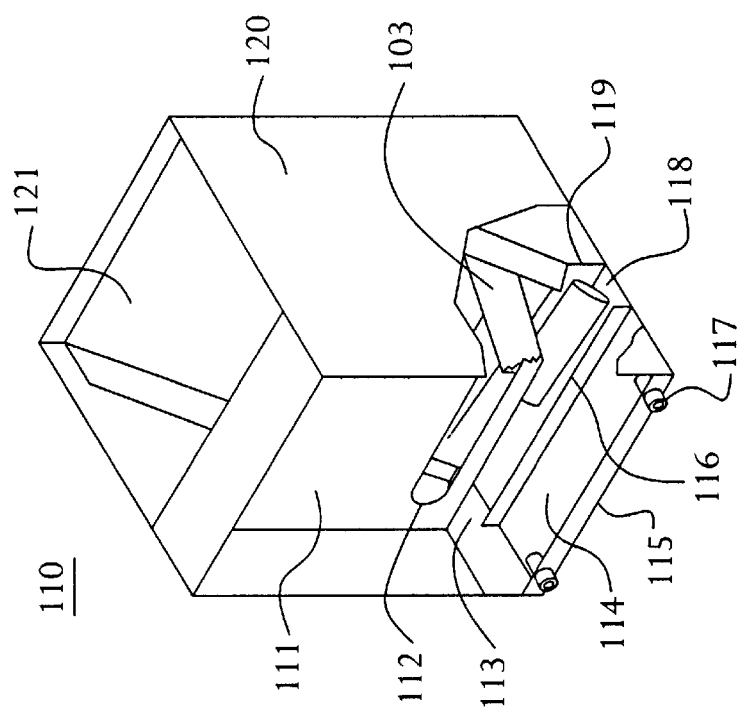
FIG. 3 is a partial cut-away isometric view of the hopper shown in FIG. 1.

FIG. 3 is a front isometric view of the hopper 110. Hopper 110 is formed with a front panel 111, a sloped rear panel 121, two side panels 120, and a bottom panel 122. Front panel 111 has slots 112 and 113. Front panel 111 is recessed, so that a hollow having a receiving surface 114 is formed from bottom panel 122, front lip 115 and rear lip 116. Rear panel 121 slopes from top to bottom toward front panel 111, leaving a groove 118. Groove 118 is formed by the bottom 122 and lip 116 and 119. Lip 115 is fitted with bumpers 117. A bottom mounting surface 123 is attached to the bottom of hopper 110.

Figure 4:
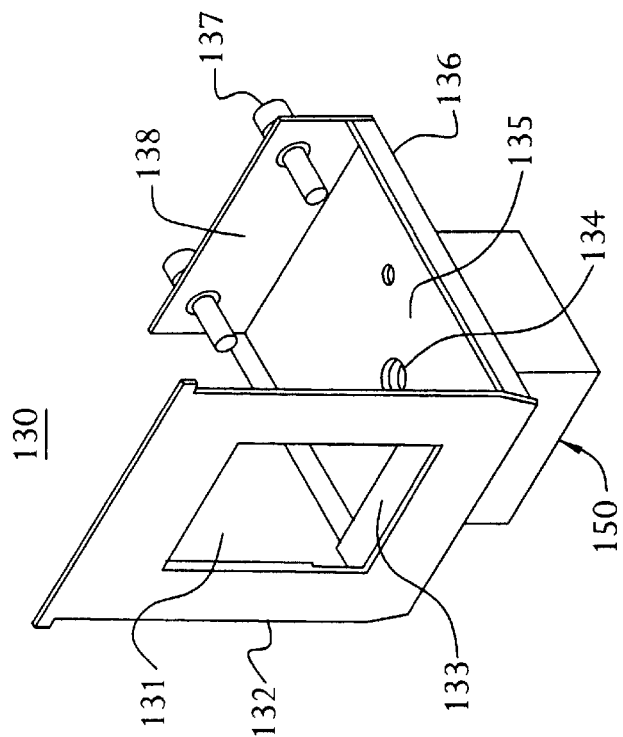
FIG. 4 is a front isometric view of the mounting bracket shown in FIG. 1.
Figure 5:
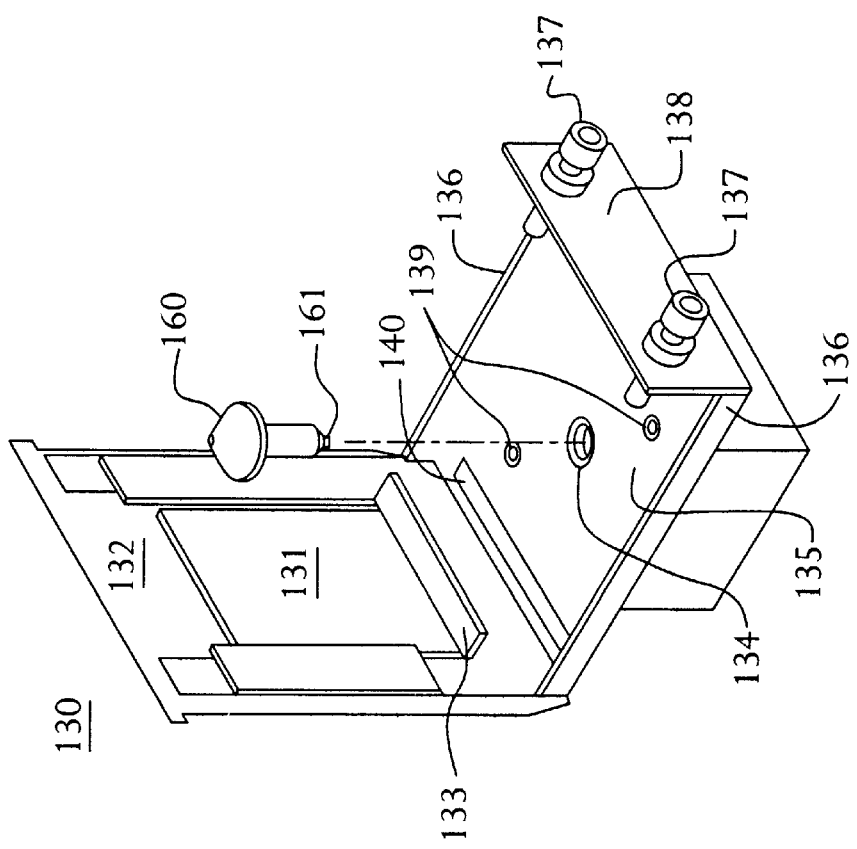
FIG. 5 is a rear isometric view of the mounting bracket of FIG. 4.

FIGS. 4 and 5 show the mounting bracket 130. Mounting bracket 130 is formed with a front panel 132, a rear panel 138, side panels 136 and a bottom panel 135. Front panel 132 has an opening 131 and a lip 133. Capture screws 137 pass through rear panel 138. Bottom panel 135 has a hole 134, holes 139, and a slot 140.

Although the exemplary mounting bracket 130 is adapted to fit a standard cage 102, one of ordinary skill can readily modify the front face of mounting bracket 130 to fit non-standard animal containers (not shown).

FIG. 6 shows the load cell assembly 150. A box 151 (which may be formed from aluminum, for example) encloses the load cell assembly. A block 152 (which also may be aluminum) is mounted in box 151. Load cell 153 is mounted to block 152. A further block 157 (which may also be aluminum) is mounted to the other end of load cell 153. A blind hole 158 is formed in aluminum block 157. Overload mount 155 is also mounted to aluminum box 152. A hole 159 in box 151 lines up with a blind hole 158.

Figure 15:
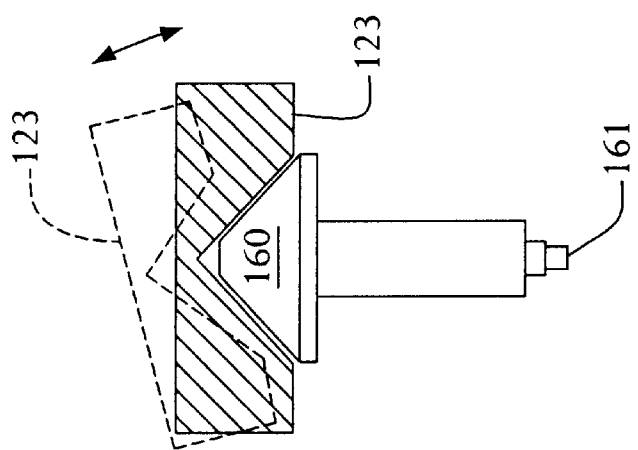
FIG. 15 is a partial cross section of the self-centering approximately conical mount shown in FIG. 2.

FIG. 15 shows a self-centering mount 160, which may be approximately conical. Conical mount 160 passes through hole 159 and seats in blind hole 158. The self-centering mount 160 is fitted with a spring plunger 161. The exemplary self-centering mount 160 may be a full cone or a truncated cone. Other self-centering shapes may also be used, to long as they do not transmit an upward force or moment to the load cell 153, as described below. It is also contemplated that other self-centering mounting surfaces may be used, such as a pyramid, a truncated pyramid with a trapezoidal cross section, a spider mount, a paraboloid or ahyperboloid. The self-centering mount 160 is hereinafter referred to as "conical mount".

Dynamic Mounting of Food Hopper

In the exemplary configuration, mounting bracket 130 is attached to cage 102, and load cell assembly 150 is attached by screws to mounting bracket 130. Approximately conical mount 160 passes through cage mount hole 134 and aluminum box hole 159. Approximately conical mount 160 seats in blind hole 158 of aluminum block 157, and is attached to load cell 153.

Several days supply of pelletized food 103 may be placed in food hopper 110. Filled food hopper 110 is mounted on cage 102 by placing hopper mount 123 on approximately conical mount 160, such that food hopper front lip 115 is under, but not touching, mounting bracket lip 133. Capture screws 137 are inserted through cage mount rear panel 138 and above food hopper bottom panel 122.

When installed food hopper 110 comes to rest, all of its weight is transferred down through conical mount 160, onto the free end of load cell 153. Except for possible light touches between food hopper bumpers 117 and cage mount 130, all of the weight of food hopper 110 is transmitted to the free end of load cell 153.

Reference is again made to FIG. 15. The bottom mounting surface 123 of the hopper 110 is shown in cross section in its rest state. The bottom mounting surface 123 is also shown in phantom in a position it may assume when disturbed. Food hopper 110 may be disturbed when animal specimen 101 is feeding, or when a technician is servicing the hopper 110. When disturbed front to back, side to side, or upwards, food hopper 110 simply rides free of the conical mount 160. When the disturbance is finished, the configurations of food hopper mount 123 and conical mount 160 allow food hopper 110 to return to its original centered, upright position by the action of gravity, with all its weight once again applied against load cell 153.

Reference is again made to FIGS. 1–6. The lip 133 of bracket 130 provides a surface that is shaped so as to provide a surface on which the specimen 101 can rest or lean without disturbing hopper 110. During a disturbance, a projecting body (for example, cage mount lip 133 above food hopper front lip 115) and one or more stops (such as cage mount capture screws 137 above food hopper bottom panel 122) prevent food hopper 110 from falling completely off conical mount 160 and cage mount 130. When at rest, these capture elements, (lip 133 and screws 137) do not touch food hopper 110. Thus, food hopper 110 is dynamically attached to cage 102 on top of load cell 153, and presents food 103 to animal specimen 101.

Operation of Food Hopper During a Meal

Technically, the exemplary BioDAQ food intake monitoring system 100 measures the amount and time of food removed from the food hopper 110. Therefore, food hopper 110 is designed to limit the food removed by animal specimen 101 to food actually consumed by animal specimen 101. To this end, access to food is limited so as to minimize food hoarding and spillage, while allowing animal specimen 101 to eat as much as it chooses.

Animal specimen 101 consumes food 103 by gnawing pieces off of the food pellets accessible through food hopper slot 113. Slot 113 is designed to be larger than the animal muzzle, but smaller than the food pellet 103. Small food pieces are removed and immediately eaten. Food fines generated by gnawing fall on food hopper receiving surface 114 for later consumption. Gnawing activity is difficult enough to animal specimen 101 that it gnaws off food chunks only for food consumption, and rarely drops food chunks it has freed.

While the animal specimen 101 is gnawing at the food pellets 103, food pellets may be forced back and away from slot 113 and out of reach of specimen 101. Food hopper 110 has a groove 118, which allows food pellets 103 to wedge in place for consumption by animal specimen 101. As food pellets in groove 118 are consumed, new food pellets can fall down to replace them. However, pellets 103 may wedge and bridge above groove 118, out of reach of specimen 101. This could result in long, unpredictable periods of time when food is not available to specimen 101. This is avoided by allowing access to the food through slot 112, which allows specimen 101 to paw and nuzzle food down to groove 118 and slot 113. Although a single horizontal slot 112 is shown, a plurality of horizontal slots or vertical slots, a grid, a mesh, or a plurality of holes may be provided for this purpose. Additionally, the dynamic mounting of food hopper 110 on conical mount 160 allows food hopper 110 to shake, sway and tip, and rock quite vigorously, thus reducing bridging of food pellets above groove 118, and assuring their unlimited presentation to animal specimen 101.

Since specimen 101 cannot access food 103 from above food hopper 110, there is no fouling of food with urine or feces; nor can animal specimen 101 use food hopper 110 for nesting.

The configuration 100 shown in FIGS. 1–3 allows use of pelletized food 103. It eliminates food spillage, therefore eliminating the need to collect food particles and their separation from urine, feces and bedding during food intake analysis. It eliminates fouling of food with urine and feces. And it eliminates the use of food containers for nesting.

Figure 17A:
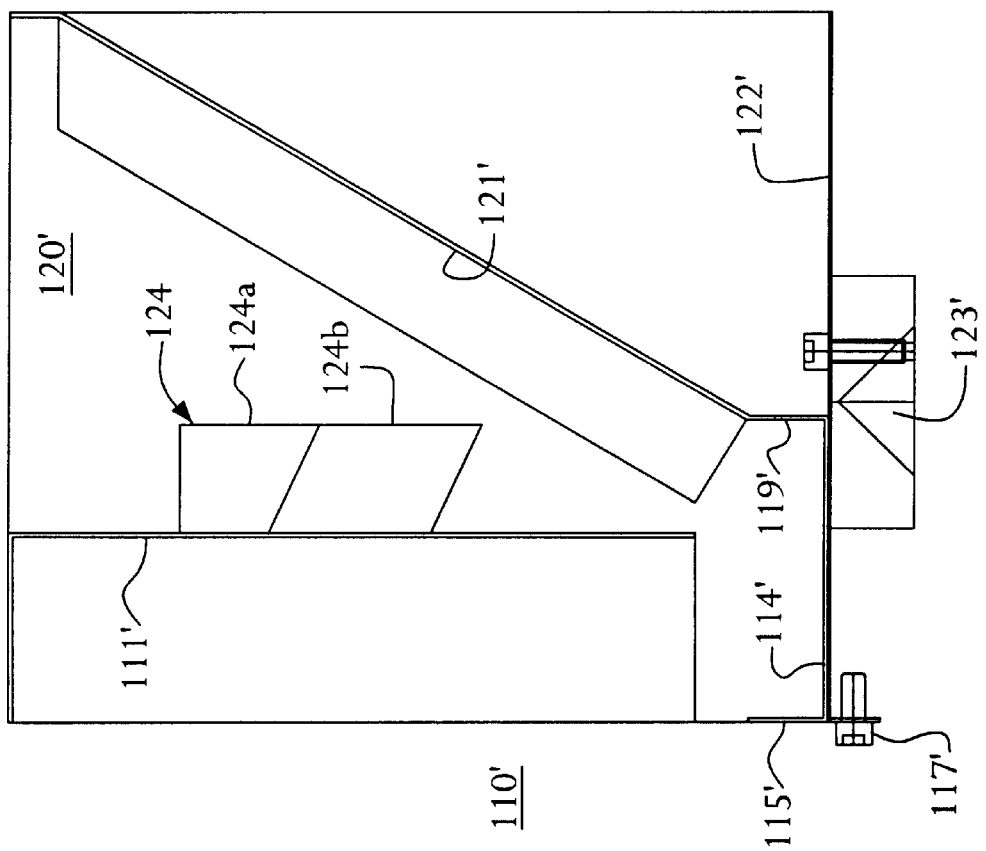
FIGS. 17A–17C show a variation of the food hopper of FIG. 2.
Figure 17C:
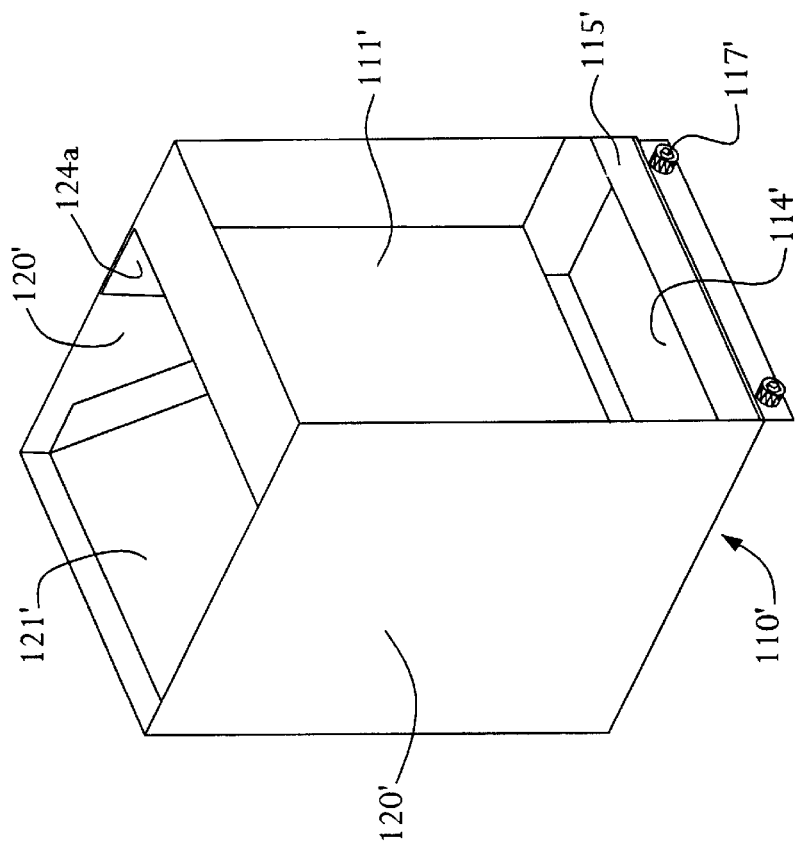
Figure 17B:
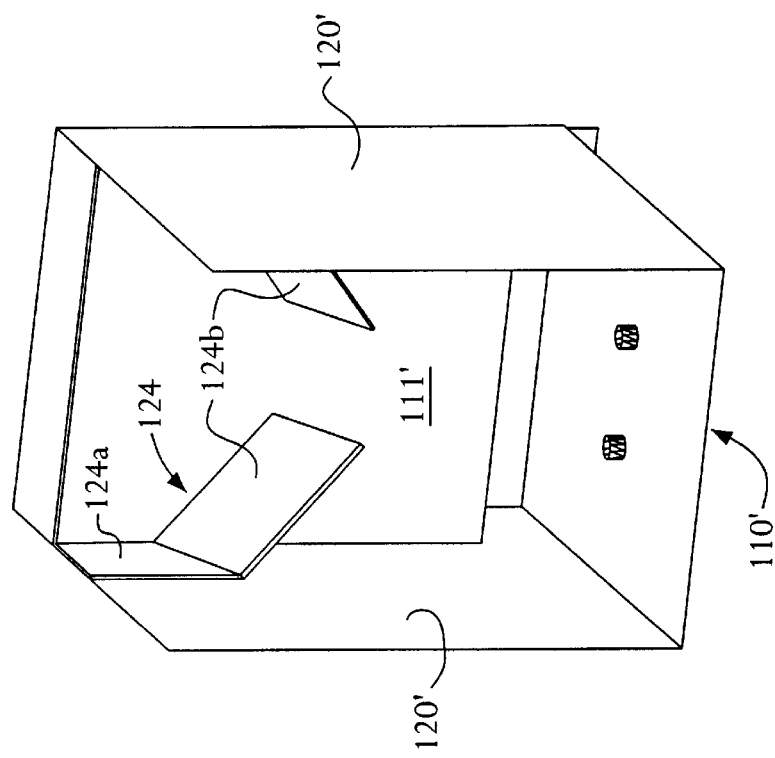

Although a preferred use of the exemplary hopper 110 is for pelletized food, the hopper can also accommodates powdered or granular food. FIGS. 17A–17C show a variation of the hopper 110' which may be more advantageous for use with granular or powdered food. FIG. 17A is a cutaway right side elevation view of Hopper 110' with the right side wall 120' removed. FIG. 17B is a cutaway front isometric view of hopper 110' with the front panel 111' removed. FIG. 17C is a front isometric view of hopper 110'. Hopper 110' has several features in common with the hopper 110 of FIG. 1. The front lip 115', screws 117', wall 119', sides 120', rear wall 121' bottom surface 122', and conical mount 123' of hopper 110' are the same as the respective front lip 115, screws 117, wall 119, sides 120, rear wall 121, bottom surface 122, and conical mount 123 of FIG. 1.

Hopper 110' has three main features which differentiate it from hopper 110. (1) Hopper 110' has a pair of baffles 124 which loosen the granular or powdered food and prevent it from becoming packed or jammed in the hopper 110'. (2) The front face 111' of hopper 110' does not have the slots 112 or 113 that are included in hopper 110 (FIG. 1). (3) Hopper 110' does not have the rear lip 116 that is included in hopper 110. Food falls down from the hopper 110' directly onto the receiving surface 114', where it can be accessed by the animal specimen.

Referring again to FIGS. 1–4, in addition to solid food, the exemplary system may be used to accommodate liquid. A conventional liquid bottle having a drinking tube at its bottom end may be inserted into the hopper, with the drinking tube inserted through the slot 112.

To operate this food hopper system 100 for manual food intake analysis, one need only pre-weigh the full food hopper 110, place it on the cage mount 130, wait a specified time period, remove the food hopper 110, post weigh the food hopper and calculate the food intake as the difference between the two weights. The inventors have further improved this system by automating the measurements, thus allowing unattended, and undisturbed, high resolution (by time) analysis of food intake.

Figure 14:
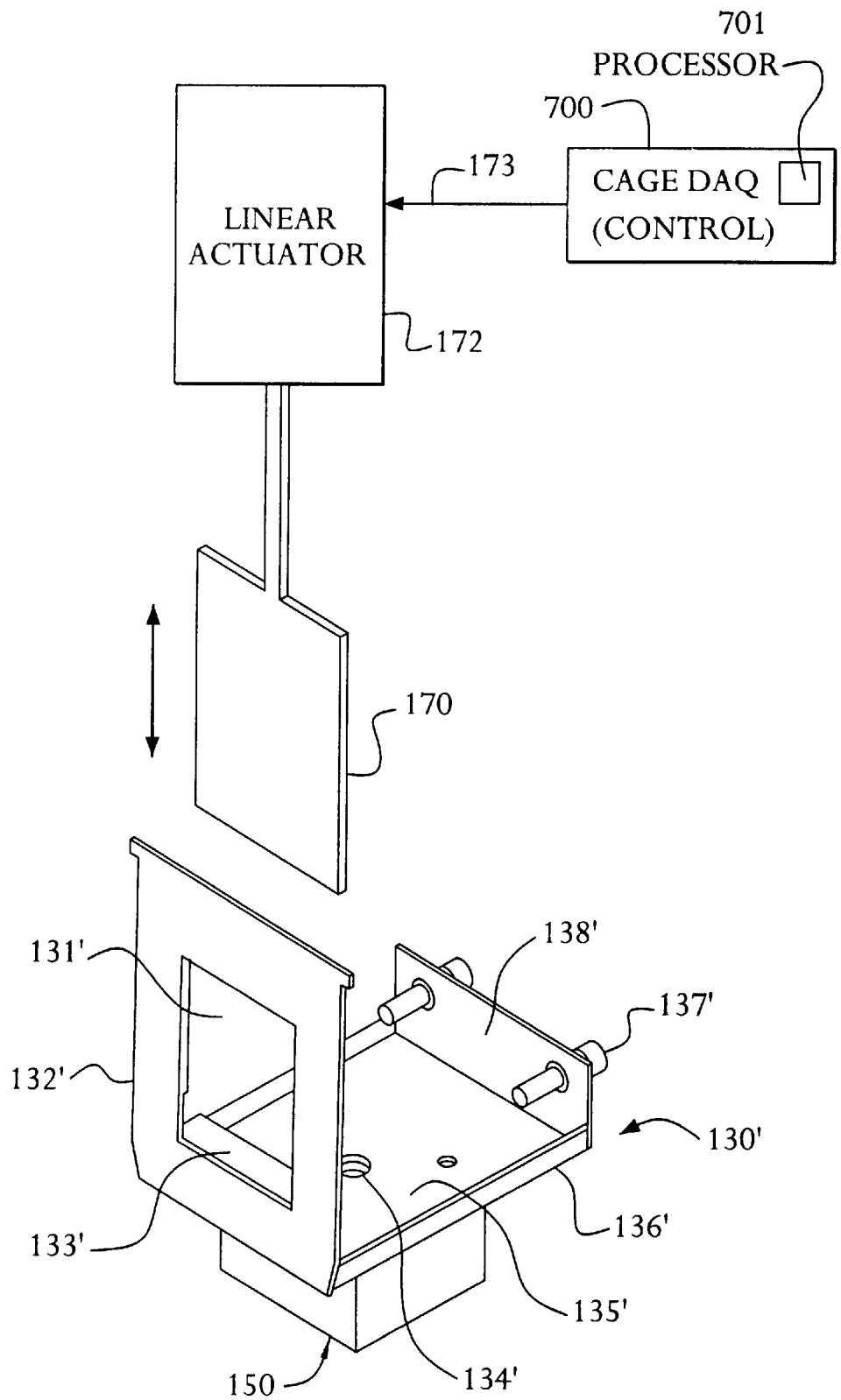
FIG. 14 is a diagram showing a variation of the mounting bracket of FIG. 4, including an electrically controlled gate.

FIG. 14 shows an optional feature of the feeder 100. Each cage mount 130 may include an optional gate 170. The gate 170 maybe manually or automatically controlled. FIG. 14 shows an automatically controlled gate 170, which is lowered and raised by a simple linear actuator 172. For automatic control, the actuator 172 is controlled by the CageDAQ 700, which is described further below, with reference to FIG. 7.

Load Cell Assembly with Load Cell/Food Hopper Interface Description

The Load Cell Assembly 150 is a device which provides an electrical signal proportional to the weight of the food hopper 110 and its contents 103.

This conversion of weight to an electrical signal is performed by the sensor 153. This sensor 153 is mounted into a housing 151, which acts as the sensor's mechanical ground, and the weight is applied to the mechanically live end of the sensor 153 via the conical mount 160. To prevent gross overload of the sensor during transport, set-up and handling; two overload stops, (155 and 156) are attached to the housing. These overload stops 155, 156 limit the deflection of the sensor 153 to keep it within its elastic limit.

Electrical power input, signal output and electrical screening are provided via the connector 162. The attachment of the mounting bracket 130 to the Load Cell Assembly 150 is electrical as well as mechanical, so that both are at the same electric potential. The food hopper 110 is electrically isolated from the mechanically live end of the sensor 153 by sitting on the electrically insulating cone of the Conical Mount 160. In this way, any static electrical discharge which could disturb the sensor's measurement is minimized (because the food hopper is not electrically connected to the same electric potential as the load cell assembly 150 without also producing a mechanical shunt between the mechanically live end of the sensor and mechanical ground).

The conical mount 160, in addition to acting as the mechanical support for the food hopper 110, also allows the food hopper freedom of movement and rotation: It allows the food hopper to be "lively". Because the means of detection of the beginning and duration of a feeding event is the level of stability of the sensor signal, it is important that the food hopper 110 be free to move. The conical interface 160 also allows the food hopper 110 to be lifted (by the animal 101) without applying a reverse force to the sensor 153. The Conical Mount 160 applies the weight to the sensor 153 via a spring-loaded plunger 161. The gap between the base of the cone 160 and the bottom panel 135 of housing 130 can be adjusted such that gross disturbance by the animal 101 applies force to the housing 130, not the sensor 153, thereby eliminating overload to the sensor.

Figure 9:
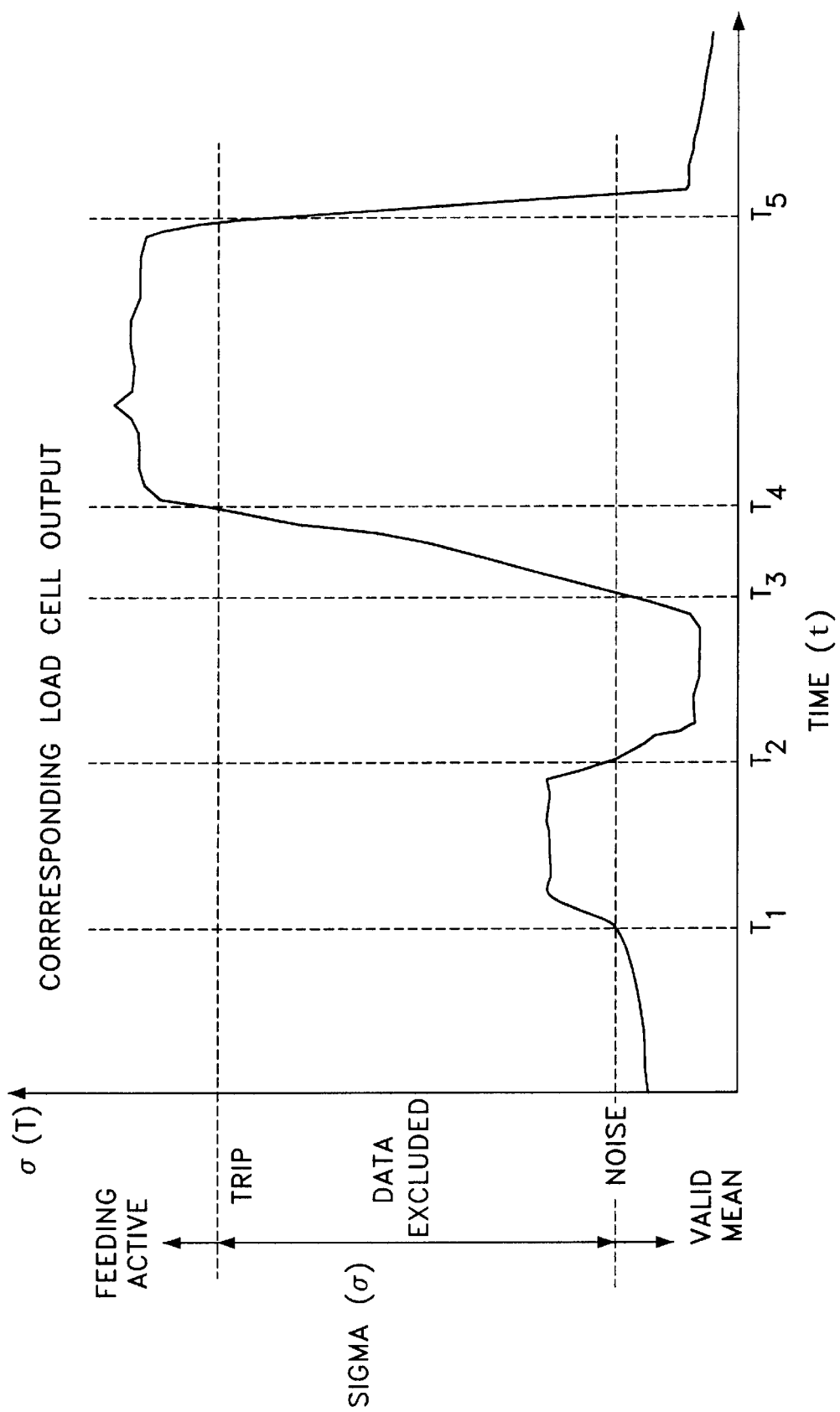
FIG. 9 is an exemplary signal trace showing the output signal of the load cell shown in FIG. 6.

The output (FIG. 9) of the load cell assembly 150 is a function of the applied weight. If the food hopper is undisturbed, the signal is substantially constant over time (except for thermal noise). If the food hopper 110 is mechanically disturbed by the animal 101, the signal varies. By determining the onset of signal variation, it is possible to determine the start of the animal's feeding. By measuring the length of time of a disturbance, it is possible to determine the duration of the feeding. By determining the difference between the sensor signal in the quiescent periods before and after a disturbance, it is possible to measure whether any weight is removed from the food hopper 110.

The exemplary method used to determine the onset of signal variation is to determine the variance or standard deviation about the mean of N samples of the sensor signal, taken at 50 samples/second. Other statistical methods may also be used. Further, the number N may be varied.

Sensor

The exemplary sensor 153 is a thin film strain gauged load cell, although any force sensing device could be used, (such as force balance sensors, silicon strain gage sensors, capacitance sensors, quartz sensors, pressure sensors, pressure transducers, etc.). A thin film strain gauged load cell 153 is a mechanical flexure device (spring) which has a surface strain proportional to the force applied to it. A resistive circuit is deposited in intimate contact with the surface under strain in such a way that the strain in the surface is transmitted to the resistive circuit. The resistance of the circuit changes as a linear function of strain, so that changes in resistance may be converted to a measure of applied force.

The housing 130 acts both as a mechanical mount and an electromagnetic screen. The conical mount 160 transfers the dynamic weight of the food hopper and its contents to the load cell while electrically isolating the two.

CageDAQ Logic/Functional Description

Functional Blocks

Figure 7:
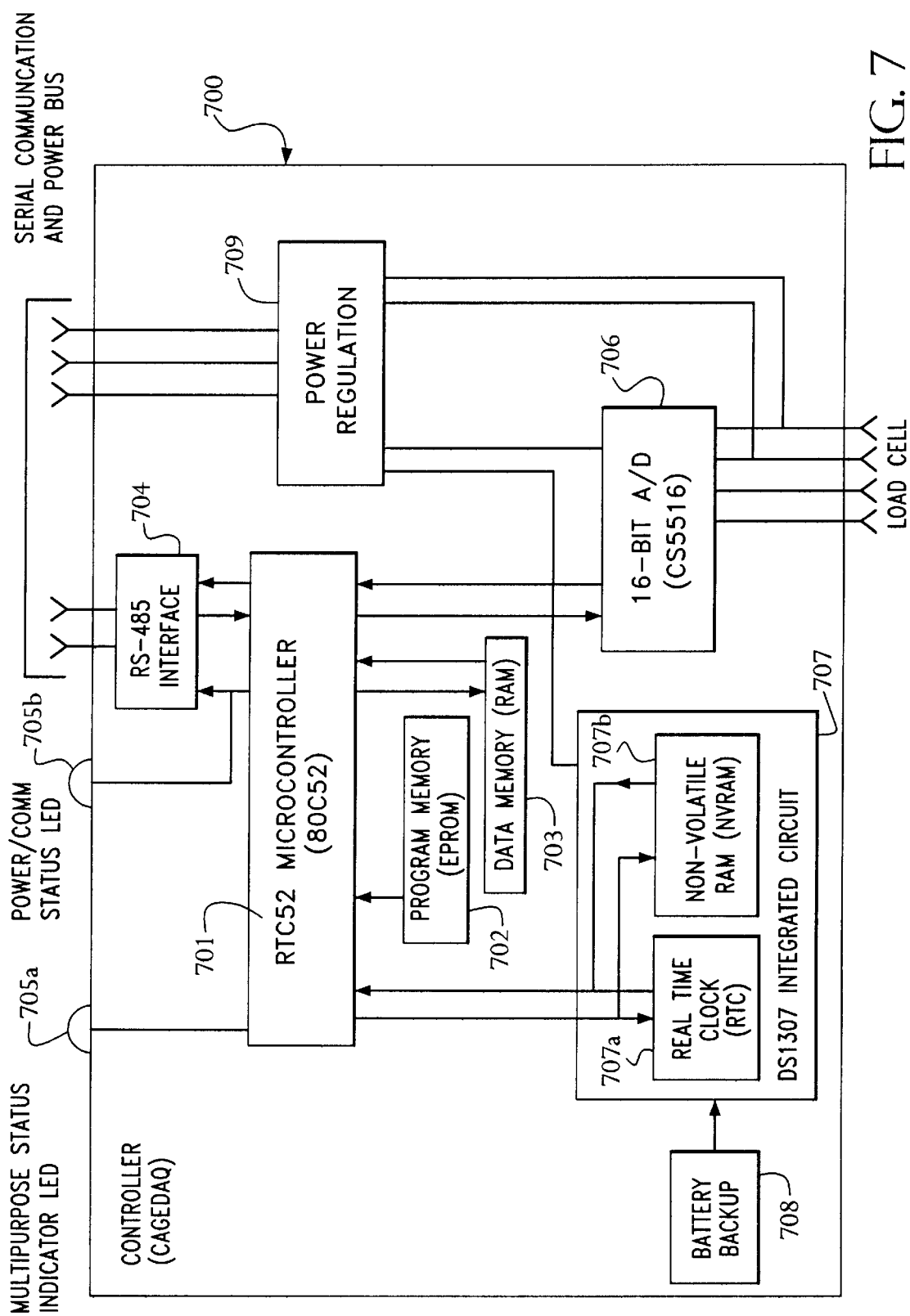
FIG. 7 is a block diagram of an exemplary controller for monitoring and controlling the feeder shown in FIG. 1.

FIG. 7 is a functional block diagram of an exemplary CageDAQ module 700. One of ordinary skill in the art recognizes that the components listed below are only exemplary in nature, and do not limit the scope of the invention. Other devices which perform the functions described below may be substituted as they become available.

The exemplary CageDAQ module 700 has as its core an 8-bit microcontroller 702, which may be, for example, the Intel 80C52. This is a member of the 8051 family, implemented using complementary metal oxide semiconductor (CMOS) technology for low power consumption, without internal electrically erasable programmable read only memory (EPROM) for programs. Microcontroller 702 executes instructions from an external program EPROM 702. The program's variable (data) space is a static RAM chip 703.

In the example, communication with a host computer is handled by a generic RS-485 interface IC 704. RS-485 is an IEEE electrical standard intended for implementing simple networks by serial multidrop communications. It uses a balanced line (complementary signal lines instead of a single signal line) to achieve noise immunity. It is good for applications requiring moderate (sub-Ethernet) bandwidth.

Exemplary light emitting diodes (LEDs) 705a and 705b are simple visual status indicators. LED 705a is a multipurpose status indicator. The microcontroller 701 can make LED 705a blink at different rates to indicate different states in the data reduction algorithm. LED 705b is normally in the ON state to indicate that power is on. LED 705b blinks off briefly when the CageDAQ 700 is transmitting data, then returns to the ON state.

Data collection is achieved by the Crystal Semiconductor CS5516 A/D converter 706. It is optimized for strain gauge (bridge) signal conditioning with no signal amplification required, and has 16-bit resolution (to 1 part in 65536). The CS5516 as configured in the CageDAQ samples the WeighDAQ load cell strain gauge at a rate of 50 16-bit samples/second.

Another integrated circuit (IC), the Dallas Semiconductor DS1307 707 provides two functions: a real-time clock or RTC 707a and non-volatile RAM or NVRAM 707b, each distinct enough to be considered separate functions. The RTC 707a provides a stable, accurate time base for marking the beginning of feeding events and measuring their duration. The NVRAM 707b is used for storing measurement parameters and the most recent feeding event. A small battery 708 maintains the contents of the NVRAM 707b and keeps the RTC running when main system power is off. NVRAM 707b provides the ability to locally access the storage medium.

A voltage regulator 709 maintains appropriate supply voltage to all IC's and provides the excitation voltage to the load cell bridge.

Statistical Data Reduction Method

Figure 8A:
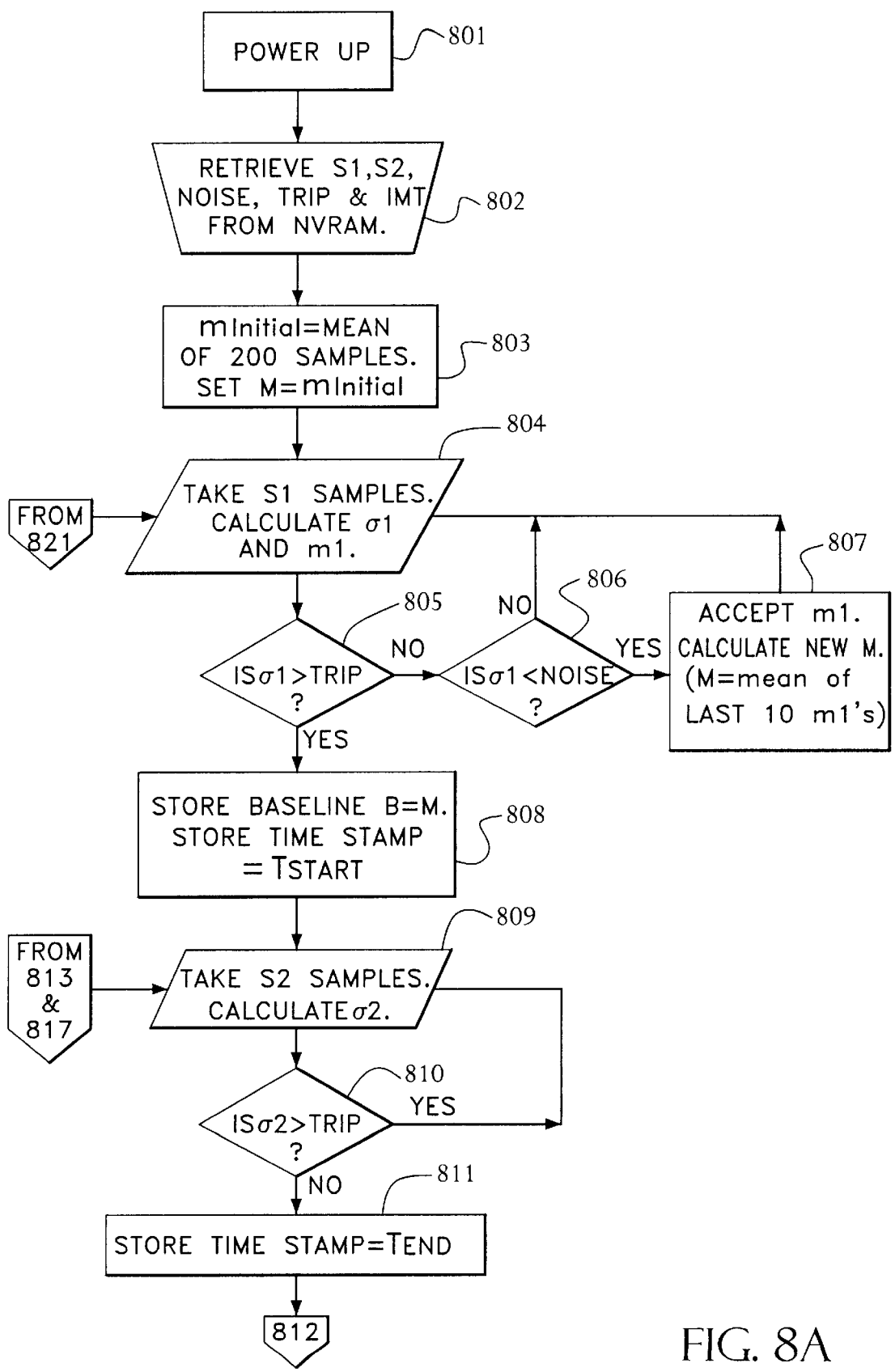
FIGS. 8A and 8B are flow chart diagrams showing the monitoring algorithm for measuring feeding time and food consumed using the feeder shown in FIG. 1.
Figure 8B:
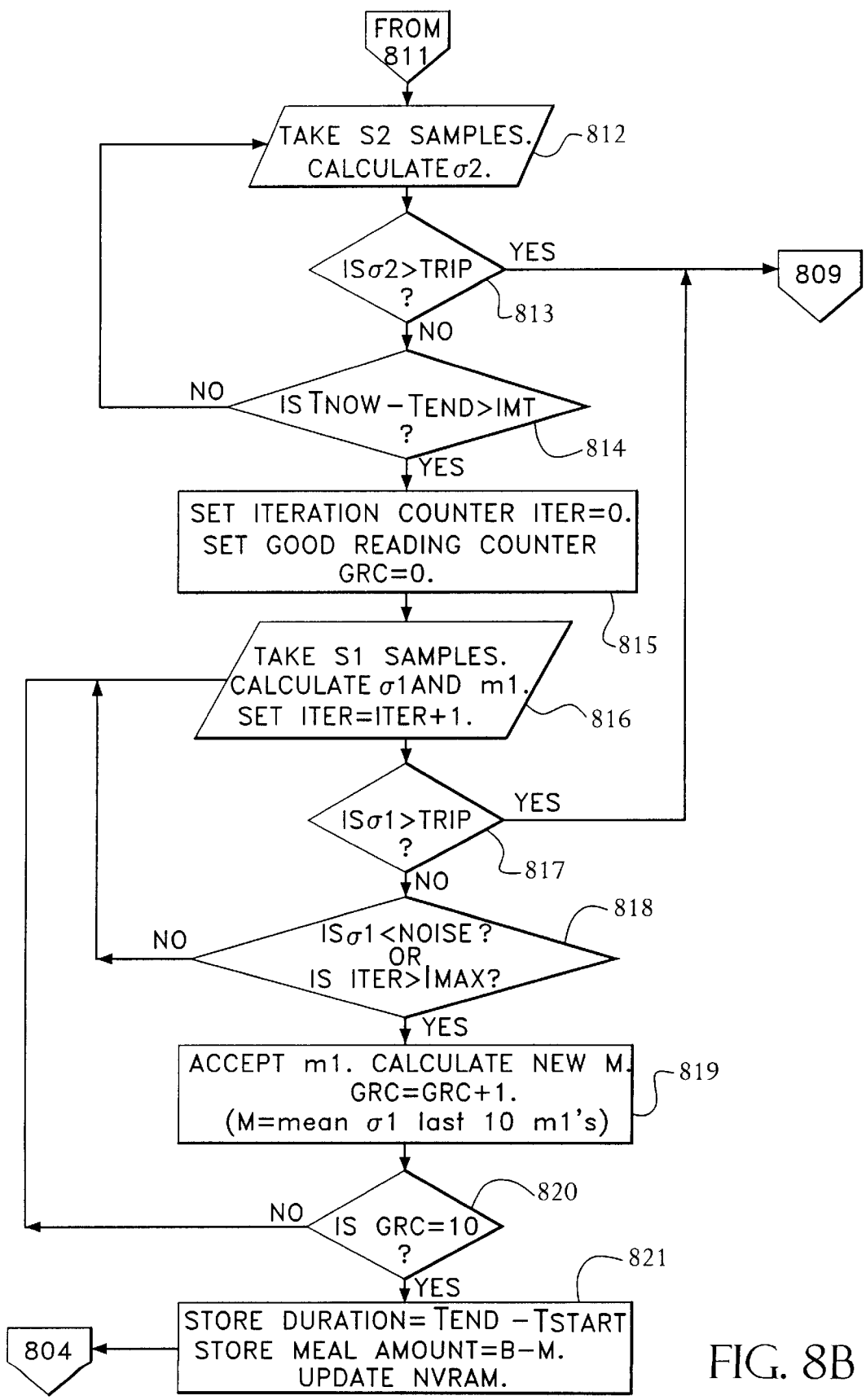

FIGS. 8A and 8B are flow chart diagrams showing the CageDAQ Statistical Data Reduction Algorithm.

Measurement Parameters

The CageDAQ 700 maintains a set of measurement parameters archived in its NVRAM 707b, which are retrieved to data memory when the CageDAQ program begins executing. These parameters are initially downloaded by the host PC 1102 but once a set of measurement parameters are in place, a CageDAQ 700 can execute its measurement algorithm without any external control. The measurement parameters are:

| | |
|---|---|
| S1 = | Number of samples to be taken per mean and standard deviation, before feeding activity is detected. |
| S2 = | Number of samples to be taken per mean and standard deviation, while feeding activity is detected. |
| Noise = | Threshold value of standard deviation (σ) below which a mean is considered valid. |
| Trip = | Threshold value of standard deviation (σ) above which is considered eating activity. |
| IMT = | Inter-Meal Time: A period in seconds defining the minimum interval between meals. |

Mean, Standard Deviation, Noise and Trip

Summarizing the algorithm, the CageDAQ 700 continually collects $S_n$ samples as a group, where n=1 or 2 depending on whether feeding activity has been detected. After each $S_n$ samples, the CageDAQ 700 computes mean (m) and standard deviation (σ) of the S samples.

A single mean m is an average indication of hopper weight. However, the CageDAQ 700 maintains a more stable indication of food hopper weight: M, which is an average of the last ten valid values of m. This is equivalent to $(10*S_n)$ individual weight readings averaged together. The use of M allows the CageDAQ 700 to establish an extremely stable baseline weight. As described below, a mean m may be excluded from the larger running average M if its associated variance or standard deviation is too high.

Standard Deviation is a Measure of Signal Quality. In the absence of a laboratory animal, σ would be some very low value, changing very little from one set of samples to the next. With an animal in the cage, σ varies depending on what the animal is doing. The value of σ tells the CageDAQ 700 three things, depending on its value:

If σ is below the Noise threshold, the animal is quiescent and the CageDAQ 700 considers the current value of m to be valid. It can add m to the running average M of food hopper mean weight. In the graph of σ(t) in FIG. 9, this corresponds to the periods $T_0$–$T_1$, $T_2$–$T_3$, and beyond $T_6$.

If σ is above Noise but below Trip, there is some animal activity but not enough to be considered feeding. More importantly, the value of m is not considered valid because the variation of samples within $S_n$ is too high. The current m is not added to M, the running average of mean food hopper mean weight. In the graph of σ(t) in FIG. 9, this corresponds to the periods $T_1$–$T_2$, $T_3$–$T_4$, and $T_5$–$T_6$.

If σ is greater than the Trip threshold, the CageDAQ 700 recognizes that feeding activity is occurring. The value of m is still not valid for updating a weight baseline, but this does not matter. While σ is this high, the CageDAQ 700 does not monitor m at all. In the graph of σ(t) in FIG. 9, this corresponds to the period $T_4$–$T_5$.

Referring to FIGS. 8A and 8B, the system is powered up at step 801. At power up or after reset, which are equivalent conditions, the CageDAQ microcontroller 701 retrieves measurement parameters from NVRAM 707b (step 802). The NVRAM 707b, as shown in FIG. 7, is a separate battery-backed archival memory which is separate from the microcontroller's data memory 703. Measurement parameters are protected by a checksum, so the CageDAQ 700 can determine whether they have become corrupted and re-initialize them if necessary. An initial baseline weight M is established (step 803) by averaging together 200 consecutive weight readings regardless of standard deviation, in order to establish some well-smoothed initial weight value.

At step 804, the main loop of the algorithm begins with the CageDAQ 700 taking S1 consecutive weight readings (step 804) and calculating the associated m1 and σ1. Then σ1 is compared to Trip (step 805). If σ1 is greater than Trip, then the CageDAQ 700 moves to step 808, described in the next paragraph. If σ is not greater than Trip, σ1 is then compared to Noise (step 806). If σ1 is less than Noise, then m1 is considered valid and used to update M (step 807). Then the CageDAQ 700 returns to step 804. If σ1 is not less than Noise, the CageDAQ 700 returns to step 804 without updating M.

Animal Feeding

If a is greater than Trip at step 805, a possible feeding event has begun. At step 808, the current value of M is stored as baseline B. A time stamp $T_{start}$ with the current time and date is obtained from the real-time clock, to mark the beginning of the event. The sample size now changes to S2. At step 809, S2 samples are obtained and σ2 is calculated. (Mean is also calculated but while s is higher than Noise the mean value is not used.) σ2 is compared to Trip (step 810). If σ2 is greater than Trip, then the animal feeding activity is continuing and the CageDAQ 700 returns to step 809. If σ2 is NOT greater than Trip, then the feeding event may be over. A current timestamp is obtained from the RTC and stored (step 811) as a possible end-of-event, $T_{end}$.

Inter-Meal Time

Now the CageDAQ 700 is in the inter-meal interval, of duration set by the inter-meal time (IMT) parameter. Another S2 samples are taken to calculate σ2 (step 812). If σ2 exceeds Trip (step 813), feeding is once again active within the same meal and control returns to (step 809). If σ2 does NOT exceed Trip, current time is again obtained from the RTC 707a and stored as Tnow. Elapsed time since the possible end of event (Tnow–Tend) is calculated and compared to IMT value (step 814). If the elapsed time has not exceeded the IMT, control returns to step 812 to evaluate another σ2. If elapsed time does exceed IMT, the program moves on to establish a new post-meal baseline.

Post-Meal Baseline

The program returns to using S1 samples. The program attempts to obtain ten good readings, or ten good means, for which σ is less than Noise, to set the new value of M. At step 815, the program initializes two counters, ITER and GRC, to zero. ITER is used as an emergency exit from the loop in case good readings are not obtained. GRC is the count of good readings. Now the program takes S1 samples, calculating σ1 and m1. The program increments ITER (step 816). The program compares σ1 to Trip (step 817). If σ1 is greater, the program goes back to (step 809)—the same meal is once again in progress. If σ1 is not greater, the program determines whether M can be updated. At step 818, if σ1 is less than Noise, the program jumps to step 819, where M is updated with this mean, and Good Reading Count (GRC) is incremented.

What if σ 1 is NOT Less than Noise? A worst-case scenario is that the animal finishes a meal and then, perhaps, falls asleep with its chin resting on the hopper, or some other condition occurs which causes σ 1 to be greater than Noise. If the program would require σ1 to be less than Noise in order to update the new baseline, the program might enter an endless loop. So, if more than Imax iterations of the loop are executed (starting at step 816) (ITER exceeds Imax), then the program begins accepting m1 values for M even if the standard deviation exceeds Noise. That is the purpose of the ITER counter: to keep the algorithm from getting stuck updating the baseline.

At step 820, when M is the average of ten m's, the new baseline weight has been established. The program finalizes the meal information at step 821. The duration of the feeding and the amount of food consumed are stored. The amount of food equals B–M (the baseline stored back up in step 808 minus the current baseline). This meal event or vector is stored in NVRAM 707b, so that it is retained and reported even if the power supplied to CageDAQ 700 is interrupted.

The exemplary method is described above in the context of monitoring animal feeding behavior. The exemplary apparatus can also be used to monitor other animal behaviors. The combination of the conically mounted hopper 110 and the load cell 150 is very sensitive to vibrations in the animal's cage 102. The hopper 110 may even amplify the vibrations. In any event, the vibration patterns collected and recorded by the exemplary apparatus can be amplified (if necessary) and analyzed for their harmonic content. Based on the harmonic content of the vibration, it is possible to determine what type of behavior the animal is performing (e.g., feeding, walking, running on a treadmill, etc.) Further, if the sensor is sufficiently sensitive, it may be possible to detect and record the animal's breathing rate based on these measurements.

If non-feeding behaviors are to be monitored, it may be desirable to optionally include a second sensor coupled to the animal's cage, to detect cage motion. The data from this second sensor may be analyzed in a manner similar to that described above.

Optionally, additional sensors may be added, and data can be captured and correlated with the data from load cell 150. As noted above, the system can capture data characterizing the environment, such as relative humidity, temperature, light, noise, and the like. These data may be correlated with the data characterizing the animal's activity or rest behavior signature, its body weight, breathing rate, and heart rate.

Optionally, data from additional sensors may also be correlated with the type of feeding regimen (e.g., whether ad libitum or restricted).

Multiple Cage Configurations

Figure 10:
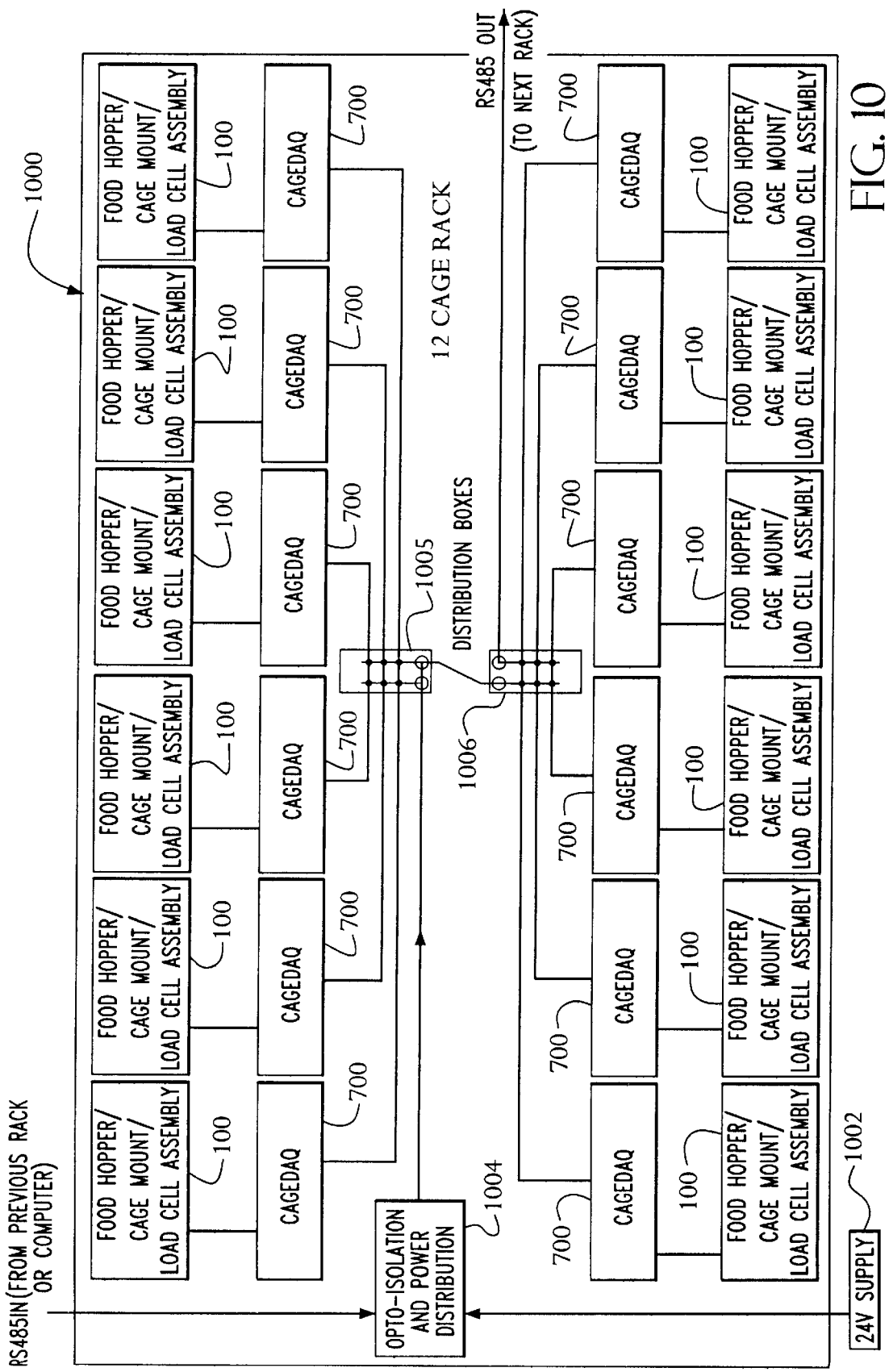
FIG. 10 is a block diagram showing a feeder cluster, which includes a plurality of animal feeders (such as the feeders as shown in FIG. 1), and a plurality of controllers (such as the controllers shown in FIG. 7).

An advantageous feature of the present invention is the ability to control and monitor a plurality of animal feeders 100 remotely. FIG. 10 shows is a block diagram of a 12 cage rack 1000, through which a plurality of feeders 100 are controlled.

Another aspect of the invention is a system and method for controlling feeding of a plurality of animals. A plurality of animal feeders 100 are provided. Each feeder 100 has a respective gate 170 (FIG. 14). Each gate 170 has an open position and a closed position, such that a respective animal 101 can access food 103 from a respective feeder hopper 110 when the gate 170 of that feeder is open, and the respective animal cannot access food from a respective feeder when the gate of that feeder is closed. A processor 701 (FIG. 7) determines an amount of food removed from each respective feeder 110 by the respective animal that has access to that feeder. A plurality of actuators 172 automatically open and close each gate 170 in response to control signals 173.

Figure 16:
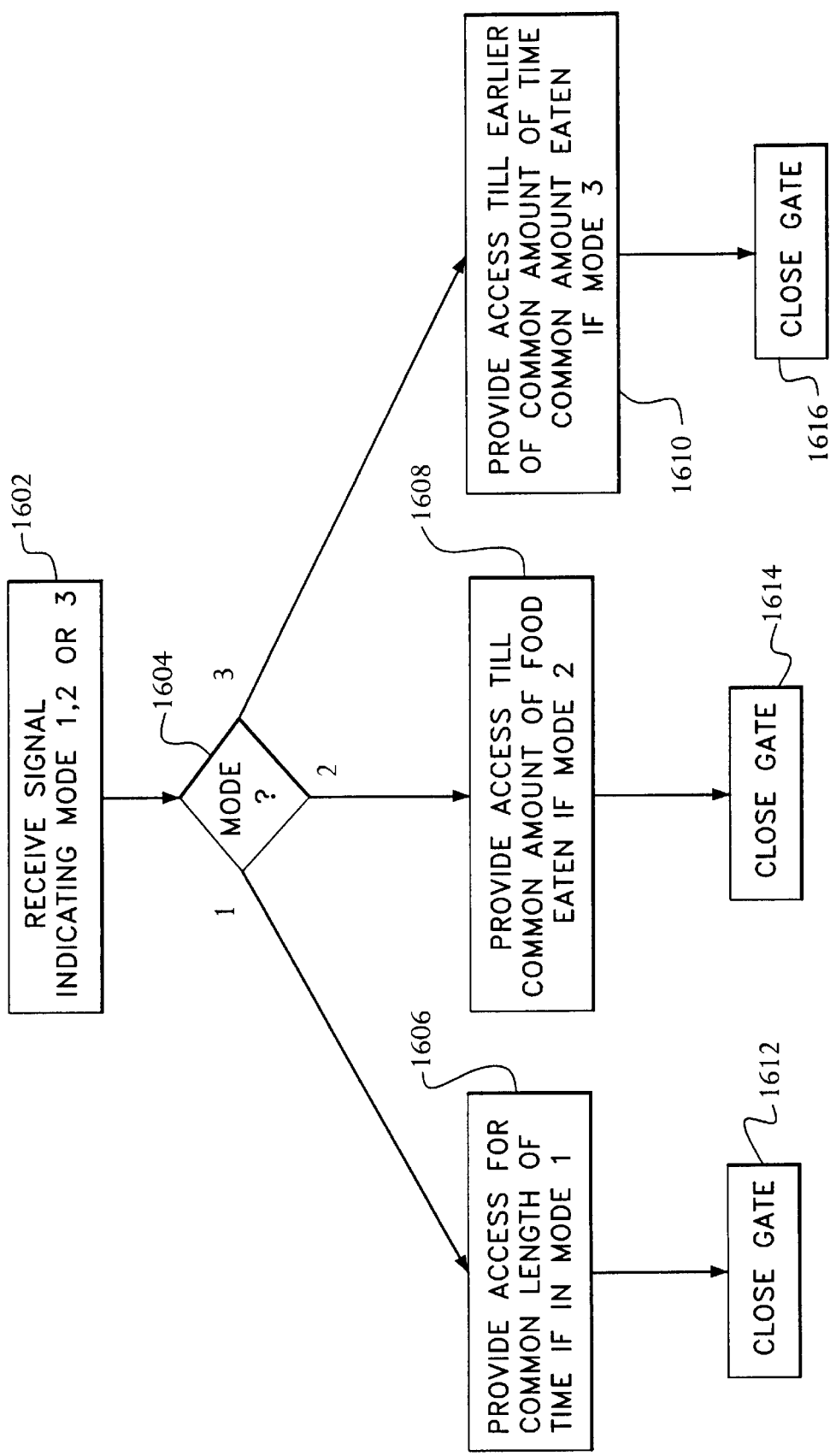
FIG. 16 is a flow chart diagram showing three methods of controlling feeding times through gate openings and closings.

FIG. 16 is a flow chart diagram of the steps executed by the processor 701. At step 1602, the processor 701 receives a signal indicating that either a first operating mode, a second operating mode, or a third operating mode is selected. At step 1606, the processor 701 generates and transmits the control signals 173 to each of the plurality of actuators 172 so as to provide access to each animal 101 for a common length of time, if the first operating mode is selected. Then, at step 1612, the gate 170 is closed. At step 1608, the processor 701 generates and transmits the control signals to each of the plurality of actuators 172, so as to provide food access to each animal until a common amount of food is removed from each feeder, if the second operating mode is selected. Then at step 1614, the gate is closed. At step 1610, the processor generates and transmits the control signals to each of the plurality of actuators 172, so as to provide food access to each animal until either a common length of time passes or a common amount of food is removed from each feeder, whichever occurs first, if the third operating mode is selected. Then at step 1616, the gate is closed.

In FIG. 16, the common amount of time may be a fixed, predetermined value, or it may be set dynamically when a first specimen completes a meal. Similarly, the common amount of food may be a fixed, predetermined value, or it may be set dynamically when the first specimen completes a meal.

BioDAQ Messaging Overview

FIG. 11 is a block diagram showing a plurality of cage clusters 1000 connected to a BioDAQ host 1102. A plurality of BioDAQ hosts 1102 may in turn be connected to a network 1111. The hosts 1102 communicate at the application level through BioDAQ Messaging. BioDAQ Messaging includes a set of messaging facilities that allow a BioDAQ Host Computer 1102 to communicate effectively with CageDAQs 700 and with other BioDAQ Host Computers 1102. This may be accomplished using two types of networking protocol: (1) CageNet Networking, in which local message primitives are passed between a BioDAQ Host Computer 1102 and its attached CageDAQs 700, and (2) BioDAQ Host Networking, in which remote message primitives and remote host-level messages are passed between BioDAQ Hosts 1102 on top of Internet protocol user datagram protocol (UDP) and Internet Protocol (IP).

BioDAQ Host Networking allows BioDAQ Host Applications on individual BioDAQ Host Computers 1102 to exchange messages over a network 1111. This may be for two purposes:

(a) Information sharing. Hosts can share experiment information with each other about feeding events on their respective CageNets.

(b) Control. One host can control others, thereby acquiring control over CageNets other than its own.

There are two primary advantages of BioDAQ Host Networking.

(a) Large scale collaboration. A networked BioDAQ host computer can directly compare feeding experiment data with other networked BioDAQ Host Computers down the hall or on the other side of the world.

(b) Experiment management. If a researcher has several different experiments running in different rooms, each with its own BioDAQ Host Computer, a single Host Computer can remotely control and monitor the others, allowing the user to concentrate data gathering and analysis in one place rather than collecting information from several different locations.

FIG. 11 shows the division between CageNets 1101 and other networks 1111 to which a BioDAQ Host Computer 1102 may be coupled. A CageNet 1101, to the left of the dividing line 1103, is a set of clusters 1000 of CageDAQs 700. The CageDAQs 700 are connected to a host computer 1102 by RS-485 cable and exchanging information using a set of proprietary message formats. It is a simple, robust sensor bus that is intended to operate without requiring a pre-existing network infrastructure. Larger computer networks 1111—to the right of the dividing line 1103—may be part of a LAN, WAN, or a global communications network (e.g., the Internet). The BioDAQ Host Computer 1102, if part of such a network 1111, has a NIC (Network Interface Card) such as "ETHERNET™", and may use networking protocols such as Novell Netware™, Microsoft LAN Manager™, or simply TCP/IP, the lingua franca of the Internet. Such computers 1102 may use several different protocols simultaneously. The CageDAQs 700 are simple devices that do not support Internet protocols. However, BioDAQ Host Computers 1102 running operating systems such as Windows 95 and MacOS do support Internet protocols. Therefore, an appropriate way to integrate BioDAQ CageDAQs 700 and CageNets 1101 into a larger network 1111 is by networking the host computers 1102 to which they are connected.

Security

FIG. 11 shows that, for networked BioDAQ hosts 1102, there may be external security, such as firewalls, screening routers, and the like. The exemplary BioDAQ application 1104 implements its own internal security provisions. The BioDAQ Host Application 1104 allows for two forms of security, configurable by the system administrator:

(1) Access Control: Authentication and Authorization—Authentication means proving who the user is; authorization means determining what the user is allowed to do. Authentication keys may be used to lock out remote hosts, unless they provide a password. The authorization configuration determines which remote BioDAQ hosts 1102, once authenticated, can have read and/or write access to the local BioDAQ Host Application 1104 (write access effectively means that a remote host can take over control of the local application). Both of these protections may be overridden if desired, relying instead on external security.

(2) Encryption—A variety of forms of encryption may be used to protect the contents of messages being passed between BioDAQ Hosts 1102. This is important if valuable experimental data is being passed back and forth over a non-secure network, such as the Internet. Encryption may also be disabled if the system administrator wishes.

Layering of Host Communication

Figure 12:
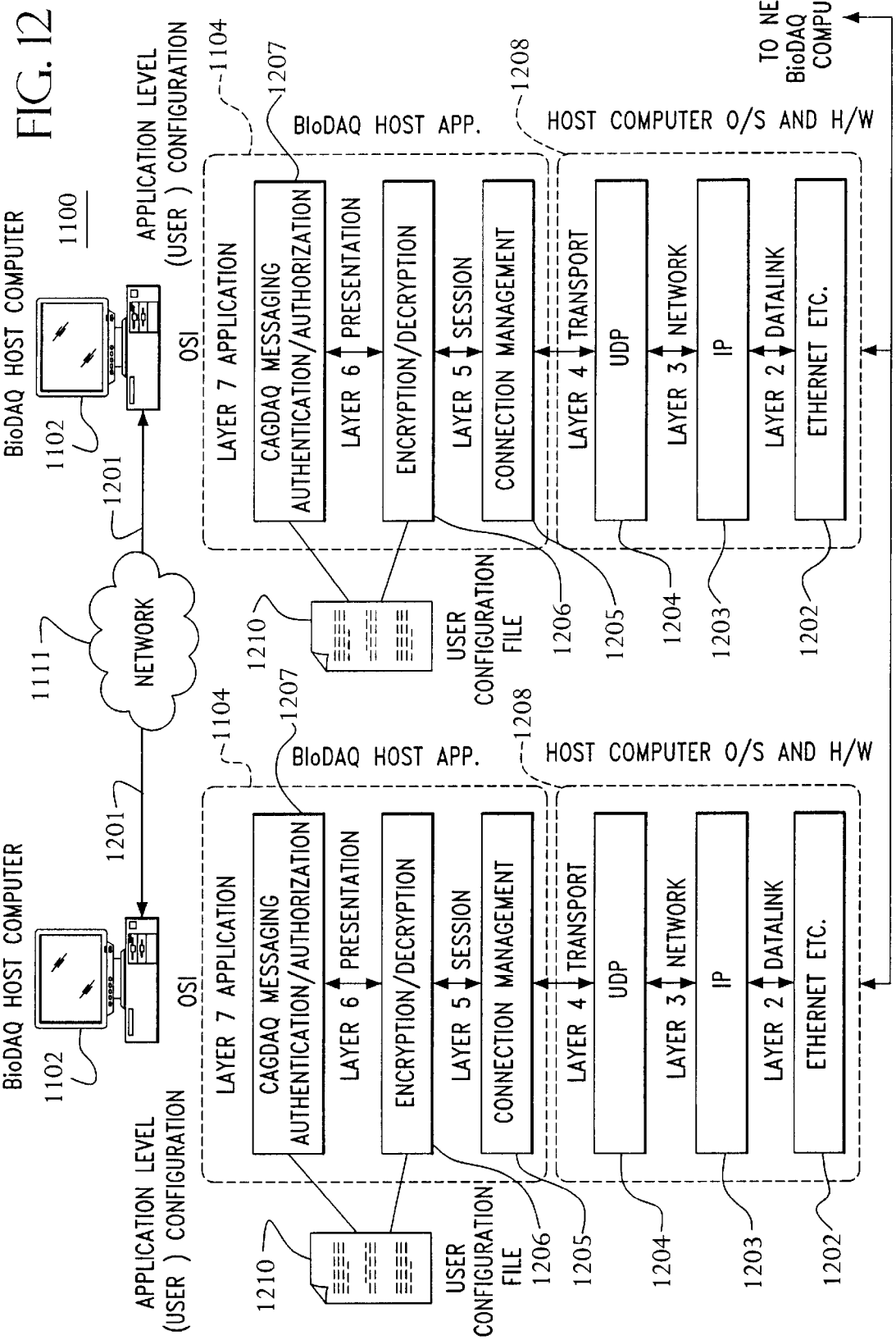
FIG. 12 shows a network architecture for monitoring and controlling the plurality of feeder clusters shown in FIG. 11.

FIG. 12 is a diagram showing how BioDAQ host computer messaging maps to the OSI 7-layer model of computer networks. Layers 4 and below (1202, 1203, and 1204) are supported by the underlying operating system 1208, which may be MacOS, Windows 95, Windows 98, UNIX, of Linux, for example. Layers 5 to 7 (1205, 1206 and 1207) are implemented within the BioDAQ Host Application 1104.

Layer 7, the Application Layer 1207, processes the contents of BioDAQ Host Messages. Application layer 1207 also handles authentication and authorization, controlled by a configuration file 1210.

Layer 6, the Presentation Layer 1206, handles encryption, if enabled by the configuration file 1210 (which is defined by the system administrator).

Layer 4—The exemplary Transport Layer 1204 is based on UDP (User Datagram Protocol) rather than TCP (Transport Control protocol). The reason is that TCP requires that two hosts 1102 establish and maintain a network connection between themselves to send information. The resource overhead of this may be unacceptably high when many hosts 1102 are involved. UDP, on the other hand, is connectionless and, therefore, uses much lower overhead, making it more feasible for many BioDAQ Hosts 1102 to communicate with each other simultaneously.

Host-to-Host Messaging

Figure 13:
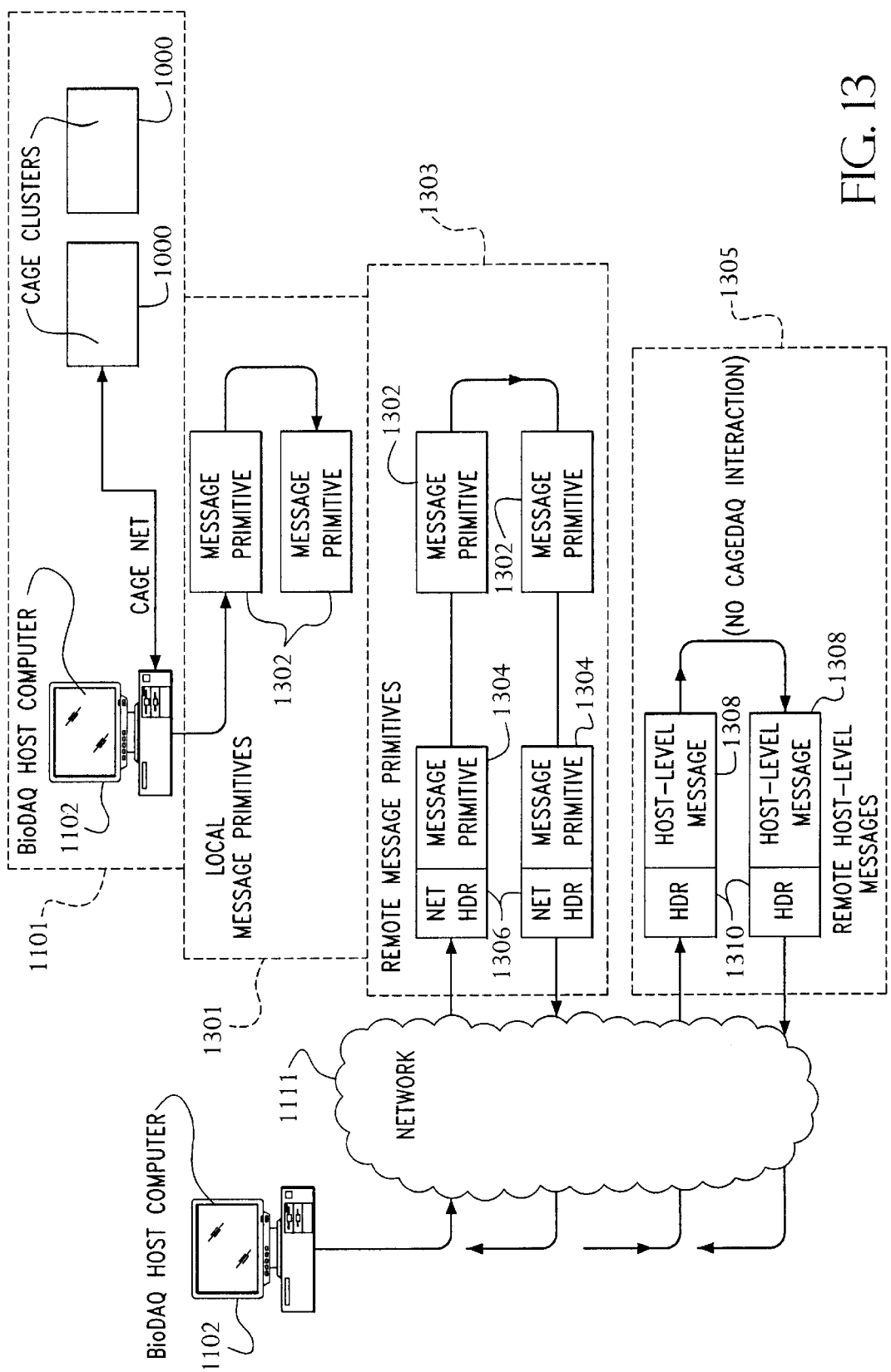
FIG. 13 is a data flow diagram showing message primitives used in the network of FIGS. 11 and 12.

FIG. 13 is a data flow diagram showing the three types of messages handled by BioDAQ Host Applications 1104. There are local message primitives 1301, remote message primitives 1303, and remote host-level messages 1305.

Message primitives 1302 are messages exchanged between a Host Computer 1102 and a CageDAQ 700. They may originate locally or remotely.

Local message primitives 1301 are the building blocks of the CageNet protocol. They are messages such as "Measure weight" or "Report last feeding event" which pass between the Host computer 1102 and CageDAQs 700 over the CageNet 1101.

Remote message primitives 1303 are message primitives that come from a remote Host Computer 1102 rather than the local one. Stripped of network header information 1106, remote message primitives 1303 are passed on to and processed by CageDAQs 700 over the CageNet 1101 in the same manner as local message primitives 1302.

Remote host-level messages 1305 do not contain any message primitives 1302 at all; they are higher-level messages which do not involve any CageDAQ communication. They travel from host to host but are not transmitted over a CageNet 1101. Examples of such messages are "What is your CageNet population (what CageDAQs are present at what addresses)?" and "Send me all of your retrieved feeding events".

Based on this architectural model, one of ordinary skill in the art of application design could readily construct program code to implement the host networking communications.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for calculating an amount of food consumed by an animal, comprising the steps of:
    (a) measuring a force applied to a food hopper and providing an output signal representing the force;
    (b) calculating an average weight of the hopper based on the output signal, and a statistical measure of the output signal other than the average weight;
    (c) identifying a beginning and an end of a feeding based on the statistical measure; and
    (d) calculating an amount of the food consumed by the animal during the feeding based on the average weight before the beginning of the feeding and the average weight after the end of the feeding.

2. A method according to claim 1, wherein the statistical measure is one of the group consisting of a variance, a standard deviation, a first derivative of the output signal with respect to time and a second derivative of the output signal with respect to time.

3. A method according to claim 1, wherein the force includes the weight of the hopper plus the weight of the food.

4. A method according to claim 1, wherein step (a) includes mechanically transmitting the force to a load cell.

5. A method according to claim 1, wherein the calculated average weight is based only on calculations of the average weight of the hopper for which the statistical measure is less than a first threshold.

6. A method according to claim 5, wherein step (c) includes determining the beginning and the end of the feeding based on times at which the statistical measure crosses a second threshold, the second threshold being greater than the first threshold.

7. A method according to claim 6, wherein a period including four consecutive crossings of the second threshold are identified as belonging to a single feeding, if a length of time between the second and third ones of the four consecutive crossings is less than a predetermined minimum length of time.

8. A method according to claim 7, wherein the statistical measure is one of the group consisting of a variance, a standard deviation, a first derivative of the output signal with respect to time and a second derivative of the output signal with respect to time.

9. A method according to claim 1, further comprising the step of preventing the force from reaching a negative value.

10. A storage medium encoded with machine-readable computer program code for causing a processor to calculate an amount of food consumed by an animal, the medium comprising:
   (a) means for causing the processor to receive a signal representing a force applied to a food hopper;
   (b) means for causing the processor to calculate an average weight of the hopper based on the signal and a statistical measure of the signal other than the average weight;
   (c) means for causing the processor to identify a beginning and an end of a feeding based on the statistical measure; and
   (d) means for causing the processor to calculate an amount of the food consumed by the animal during the feeding based on the average weight before the beginning of the feeding and the average weight after the end of the feeding.

11. A storage medium according to claim 10, wherein the statistical measure is one of the group consisting of a variance, a standard deviation, a first derivative of the output signal with respect to time and a second derivative of the output signal with respect to time.

12. A storage medium according to claim 10, wherein the force includes the weight of the hopper plus the weight of the food.

13. A storage medium according to claim 10, wherein the calculated average weight is based only on calculations of the average weight of the hopper for which the statistical measure is less than a first threshold.

14. A storage medium according to claim 13, wherein means (c) causes the processor to determine the beginning and the end of the feeding based on times at which the statistical measure crosses a second threshold, the second threshold being greater than the first threshold.

15. A storage medium according to claim 14, wherein means (c) causes the processor to identify a period including four consecutive crossings of the second threshold as belonging to a single feeding, if a length of time between the second and third ones of the four consecutive crossings is less than a predetermined minimum length of time.

16. A storage medium according to claim 15, wherein the statistical measure is one of the group consisting of a variance and a standard deviation.

* * * * *